US012398520B2

(12) United States Patent
Said

(10) Patent No.: US 12,398,520 B2
(45) Date of Patent: *Aug. 26, 2025

(54) LONG SPAN POST TENSIONED BRIDGE DESIGNS

(71) Applicant: AEEE Capital Holding & Advisory Group, Irvine, CA (US)

(72) Inventor: Mohamed J. Said, Lewes, DE (US)

(*) Notice: Subject to any disclaimer, the term of this patent is extended or adjusted under 35 U.S.C. 154(b) by 837 days.

This patent is subject to a terminal disclaimer.

(21) Appl. No.: 17/402,667

(22) Filed: Aug. 16, 2021

(65) Prior Publication Data

US 2022/0205193 A1    Jun. 30, 2022

Related U.S. Application Data

(63) Continuation-in-part of application No. 17/396,736, filed on Aug. 8, 2021, now abandoned, and a
(Continued)

(51) Int. Cl.
| | |
|---|---|
| *E01D 2/00* | (2006.01) |
| *C04B 14/06* | (2006.01) |
| *C04B 14/28* | (2006.01) |
| *C04B 18/14* | (2006.01) |
| *C04B 20/00* | (2006.01) |
| *E01D 19/12* | (2006.01) |
| *E01D 21/00* | (2006.01) |
| *E01D 101/26* | (2006.01) |

(52) U.S. Cl.
CPC ............... *E01D 2/00* (2013.01); *C04B 14/06* (2013.01); *C04B 14/062* (2013.01); *C04B 14/28* (2013.01); *C04B 18/141* (2013.01); *C04B 20/0048* (2013.01); *E01D 19/125* (2013.01); *E01D 21/00* (2013.01); *E01D 2101/262* (2013.01); *E01D 2101/264* (2013.01); *E01D 2101/266* (2013.01)

(58) Field of Classification Search
CPC ..... E01D 2/00; E01D 21/00; E01D 2101/262; E01D 2101/264; E01D 2101/266; C04B 14/06; C04B 14/062; C04B 14/28; C04B 18/141; C04B 20/0048
USPC ........................ 14/73, 73.1, 74–75, 77.1, 78
See application file for complete search history.

(56) References Cited

U.S. PATENT DOCUMENTS

| | | | | |
|---|---|---|---|---|
| 3,027,633 | A | * | 4/1962 | Murphy ................. E01D 21/06 29/469 |
| 3,906,687 | A | * | 9/1975 | Schupack .............. E01D 19/02 52/378 |

(Continued)

FOREIGN PATENT DOCUMENTS

| | | | | |
|---|---|---|---|---|
| CN | 113387647 | * | 9/2021 | |
| CN | 117266003 | * | 12/2023 | ............. C04B 28/04 |
| WO | WO20080904819 | * | 7/2008 | |

*Primary Examiner* — Raymond W Addie
(74) *Attorney, Agent, or Firm* — Gugliotta & Gugliotta LPA

(57) ABSTRACT

A precast concrete beam is provided in construction of a long span bridge structure. The beam is formed of a plurality of aligned modular elements each formed of prestressed UHPC mix as a unitary body. The UHPC mix includes discontinuous fibers distributed randomly throughout a concrete matrix. Each modular element is aligned modular and connected by an epoxy grout to adhering adjacent element joints. Finally, post-tensioning of the entire beam reinforces and affixes the plurality of aligned modular elements into a single long span beam.

10 Claims, 24 Drawing Sheets

Related U.S. Application Data continuation-in-part of application No. 17/136,774, filed on Dec. 29, 2020, now abandoned.

(56) References Cited

U.S. PATENT DOCUMENTS

| | | | | |
|---|---|---|---|---|
| 4,651,375 | A * | 3/1987 | Macchi | E01D 21/10 14/7 |
| 6,557,201 | B1 * | 5/2003 | Bowman | E01D 15/133 14/78 |
| 8,316,495 | B2 * | 11/2012 | He | E04B 5/046 52/223.7 |
| 8,650,819 | B2 * | 2/2014 | Yegge | E04C 3/26 52/223.13 |
| 9,988,775 | B1 * | 6/2018 | Garber | E01D 2/02 |
| 12,116,738 | B2 * | 10/2024 | Said | C04B 20/0048 |
| 2007/0056123 | A1 * | 3/2007 | Moon | E01D 2/02 14/77.1 |
| 2009/0288355 | A1 * | 11/2009 | Platt | E04C 3/294 52/223.13 |
| 2010/0064454 | A1 * | 3/2010 | Grace | E01D 2/02 14/73 |
| 2010/0307081 | A1 * | 12/2010 | Han | E01D 2/00 52/223.7 |
| 2013/0269125 | A1 * | 10/2013 | Grace | E01D 19/125 14/73 |
| 2014/0109325 | A1 * | 4/2014 | Han | E04B 5/10 14/73 |
| 2016/0305077 | A1 * | 10/2016 | Shamsai | E04B 5/06 |
| 2017/0233961 | A1 * | 8/2017 | Tokuno | E01D 2/02 14/73 |
| 2018/0135261 | A1 * | 5/2018 | Nelson | E01D 2/02 |
| 2018/0179111 | A1 * | 6/2018 | Fang | C04B 14/28 |
| 2020/0331805 | A1 * | 10/2020 | Guynn | C04B 28/006 |

* cited by examiner

270

LONG SPAN POST TENSIONED BRIDGE DESIGNS

RELATED APPLICATIONS

The present application is a Continuation in Part of U.S. application Ser. No. 17/396,736 filed on Aug. 8, 2021 and incorporated by reference as if fully rewritten herein.

BACKGROUND OF THE INVENTION

1. Field of the Invention

The present invention relates generally to long span bridge designs and, more particularly, to such long span bridge designs utilizing precast, post tensioned elements formed of Ultra-High-Performance-Concrete Mix (UHPC Mix).

2. Description of the Related Art

Prestressed concrete is a structural material that allows for predetermined engineering stresses to be placed in members to counteract the stresses of loads. Conventionally, it combines the high-strength compressive properties of concrete with the high tensile strength of steel.

These prestressed concrete girder bridges are currently used in bridge construction all over the world. These bridges use long 'spans', which refer to the main span of a bridge measured by the center-to-center distance of adjacent towers, pylons, piers, or supports. The longest prestressed concrete beams manufactured successfully to date were installed in the Netherlands. The main span of the bridge over the Starkenborgh Canal in Zuidhorn, Netherlands utilizes box beams that are 223 feet long and 480,000 pounds.

In many instances utilizing longer spans would result in improved performance and overall cost savings. The need for fewer towers, pylons, piers, or supports would decrease installation time and construction cost. Similarly, the installation of fewer, but longer beam spans would also enhance these benefits. However, while the need for longer beam spans has long existed, current systems lack designs, materials and methods of construction in order to achieve this longstanding need.

Consequently, the development of improved long span bridge designs, as well as the creation of improved materials and methods for, their construction, would be greatly beneficial.

SUMMARY OF THE INVENTION

It is thus an object of the present invention to provide improved precast concrete beam designs particularly adapted for long span use in the construction of bridges or the like.

It is a feature of the present invention to provide such beam designs implemented utilizing post-tensioned elements formed of a novel UHPC[1] mix.

[1] UHPC is a general term used for ultra-high-strength-concrete or similar: EA SUPER STRENGTH CONCRETE MIX™ ("EASSCM") is the UHPC mix of the present invention and provided under license by EA Precast Concrete Products & Services, LLC of Westlake Ohio.

Briefly described according to the present invention, a system for creating long span bridge designs using a series of aligned elements is provide where a plurality if interlocking "segments" are connected and post-tensioned prior to erection. Utilizing an ultra-high-performance concrete (UHPC) for the concrete segments, two different bridge system designs are provided that are structurally sound, more expeditious to build and significantly cheaper than current traditional systems. According to a first aspect of the present invention a "U" tub beam with composite deck system is provided that can span 350 feet. According to a second aspect of the present invention, a decked I-beam is provided that can span 350 feet. These systems are then compared with a typical or similar system, then to conventional systems. In each aspect of the present invention the creation of prestressed concrete beams is made with a novel UHPC mix (EASSCM) having: initial compressive strength, $f'_{ci}=10.0$ ksi; compressive strength at service, $f'_c=17.4$ ksi; modulus of elasticity of concrete, $E_c=6500$ ksi; residual rupture stress, $f_{rr}=0.75$ ksi; and concrete unit weight, $w_c=0.155$ kcf It is an advantage of the present invention to provide precast bridge beams capable of spans ranging up to about 350 feet in length.

It is another advantage of the present invention to improve the sustainability of the end use infrastructure, with useful lifespans increasing to 300+ year (as compared to 100+ year life for traditional concrete structures), resulting from greater resistance to oxidation, resistant to environmental degradation, and greater impenetrability to moisture and air.

It is yet another advantage of the present invention to provide for easier handling of the girder elements prior to erection by utilizing a number of small, precast elements that can be easily handled and shipped prior to assembly at the erection site.

It is yet another advantage of the present invention to allow for quicker installation resulting from fewer intermediary support locations, thereby reducing the cost for the support itself and savings on utility re-work, shoring, dewatering, etc.

It is yet another advantage of the present invention to provide for beam components that are almost half the weight of conventional concrete beams, thereby providing for easier handling and transportation.

It is yet another advantage of the present invention to eliminate the need for conventional steel reinforcing or stirrups along the length of the beams, thereby reducing the necessity for additional steel and its associated environmental impact.

It is yet another advantage of the present invention to provide structural elements that are inherently more fire resistant.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
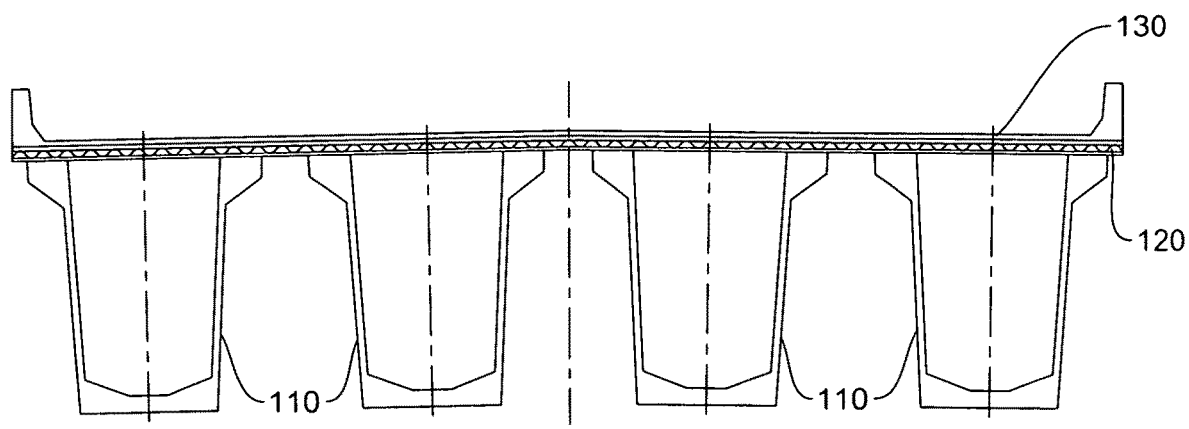
FIG. 1 is a schematic cross-sectional view of a beam bridge configuration according to a U-beam configuration embodiment of the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, two different ultra-high-performance concrete (UHPC) bridge system designs are provided that are structurally sound, more expeditious to build and significantly cheaper than current traditional systems. Throughout the various designs, a UHPC mix is provided according to Table 1.

TABLE 1

UHPC Mix Design

| Material | Quantity |
|---|---|
| Amount per YD³ | |
| Cement | 1026 pounds |
| Silica Fume | 190 pounds |
| Supplemental Material (limestone powder) | 114 pounds |
| Supplemental Material (slag) | 570 pounds |
| Masonry Sand | 1637 pounds |
| Chilled Water* | 165 pounds |
| Ice* | 165 pounds |
| High-Range Water Reducer (Chryso Premia 150 or equal) | 800 fluid ounces |
| Workability Retaining Admixture (Chryso Premia 100 or equal) | 100-200 fluid ounces |
| Steel Fibers (Duara or equivalent) | 264 pounds |
| Polypropylene Fibers (Sika or equal, for increased fire resistance) | 11 pounds |
| Water-Binder | |
| Flow Spread | Min 9 inches, just before placement in product mold |
| Min. Compressive Strength, 2-inch cubes, lab hot water cured | 25,000 psi |
| Min. tensile strength (ASTM C1609) | 2,000 psi |
| Min. cracking strength | 1,500 psi |
| Min. tensile to cracking strength (strain hardening) | 125% |
| Min. residual strength at L/150 (ductility) | 75% |
| Fire Rating | 2 hr. (compared to 1 hr. rating for other UHPC mixes in the market that only contain steel fibers) |

*Total including moisture in the sand and water in the admixtures

The use of such a cementitious material provides cost and performance improvements and result in structurally sound novel bridge designs. The use of prestressing strands for prestressing concrete elements may utilize with low-relaxation grade 270 strands having a modulus of elasticity of 28,500 ksi. According to one aspect of the present invention, strands having a 0.7-in.-diameter and an area of 0.294 in² may be used. According to another aspect of the present invention, strands having 0.6-in. diameter and an area of 0.217 in² may be used. According to yet another aspect of the present invention, strands having 0.5-in.-diameter and an area of 0.153 in² may be used. According to any aspect of the present invention, mild reinforcements of grade 60 having a modulus of elasticity of 29,000 ksi may be used.

With prestressing and reinforcement, the composition according to this preferred embodiment meets all the material requirements of the PCI, including compressive and flexural strengths. Material properties include:

Initial compressive strength, $f'c_i \geq $ ksi;

Compressive strength at service, $f'c \geq 30$ ksi;

Modulus of elasticity of concrete, Ecm=6500 ksi;
Residual rupture stress, frr=0.75 ksi; and
Concrete unit weight, wc=0.155 kcf.

For purposes of the present invention, the cement should be broadly considered within a range of equivalents to include a cementitious mixture of any type known suitably for concrete formation. The cement component may preferably be a Portland cement, or blended cements including mineral admixtures or blends calcium aluminate cements, calcium sulfoaluminate cements, alkali-activated binders, supersulfated slag cements. More generally, the cement component is to be broadly construed as any cement defined in the American Society for Testing and Materials ("ASTM") standard C150 for "Standard Specification for Portland Cement" or ASTM C595 for "Standard Specification for blended hydraulic cements" or in the European Committee for Standardization standard EN 197-1 for "Cement—Part 1: Composition, specifications and conformity criteria for common cements.

For purposes of the present invention, the silica fume or amorphous (non-crystalline) polymorph of silicon dioxide, and should be broadly construed as any material known by one having ordinary skill in the relevant art to equivalently fulfil ASTM standard C1240, "Standard Specification for Silica Fume Used in Cementitious Mixtures" or in the European Committee for Standardization standard EN 13263 "Silica fume for concrete."

For purposes of the present invention, the water component is preferably of a composition generally known by those having ordinary skill in the relevant art as including mixing water for concrete that may including various impurities. Water fulfilling the requirement ASTM C1602/C1602M or EN 1008:2002 or similar or equivalent standards may be used.

As shown in FIG. 1 through FIG. 9, a "U" tub beam design with composite deck system, generally noted as 100, is provided. Such a design is capable of spans up to 350 feet. The 350 ft span tub beam bridge system uses four tub beams 110 that are 12 ft deep with a beam spacing of 12-ft 8-in. The system makes use of a composite stay-in-place truss panel 120 with a cast-in-place (CIP) composite deck 130. The cross-section of such a bridge is shown in FIG. 1. A big advantage of the composite truss panel is that the precast UHPC portion can be placed and fit easily on top of the U-beams, eliminating the need for both the haunch and forming underneath the slab and between the beams 110. To resist a bending moment, each beam 110 may incorporate a plurality of prestressed reenforcing strands 112 within each member. Conventional concrete is a brittle material by nature, with a (relatively) weak performance in tension. To alter this characteristic and avoid a sudden brittle failure of concrete structures, reinforcing materials are embedded into the concrete matrix. In contrast, the present designs utilize UHPC that incorporate discontinuous fibers distributed randomly throughout the concrete matrix in order to provide a cementitious composite having improved performance in the fresh and hardened states, with improved elastic modulus, tensile strength, ultimate strain, and bonding and chemical compatibility provided to the matrix.

According to one embodiment of the present invention, reinforcing strands 112 formed of fiber strands may be used. The use of steel fibers having diameters of between about 0.5-inch and about 2.0-inches are preferred, with the use of an about 0.7-in. diameter steel fiber strands being more preferred for certain performance specifications. The fiber strands may further have lengths of between about ½ inch to about 5 inches. Further, it is anticipated that the use of fiber strands of a polymer material may also be used instead of steel, such as polypropylene, nylon, polyvinyl alcohol, polyolefin, polyethylene, polyester, acrylic, or aramid. Further still, the use of carbon or glass fibers, such as silica glass, basalt glass or glass fiber-reinforced polymer or basalt fiber-reinforced polymer (GFRP/BFRP) may also be used.

Figure 2:
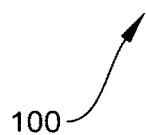
FIG. 2 is a schematic detailed cross-sectional view of an individual precast U-beam configuration for use therewith.
Figure 2:
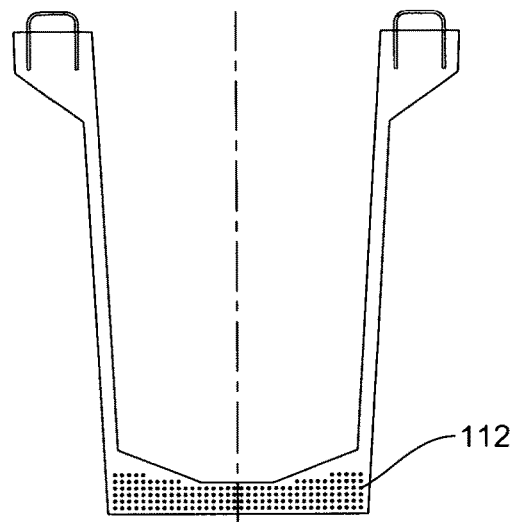
Figure 3:
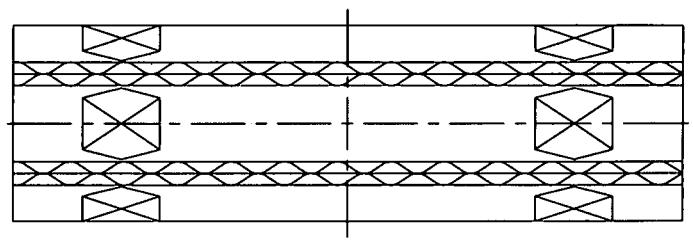
FIG. 3 is top plan view of an exemplary UHPC truss panel for use therewith.
Figure 4:
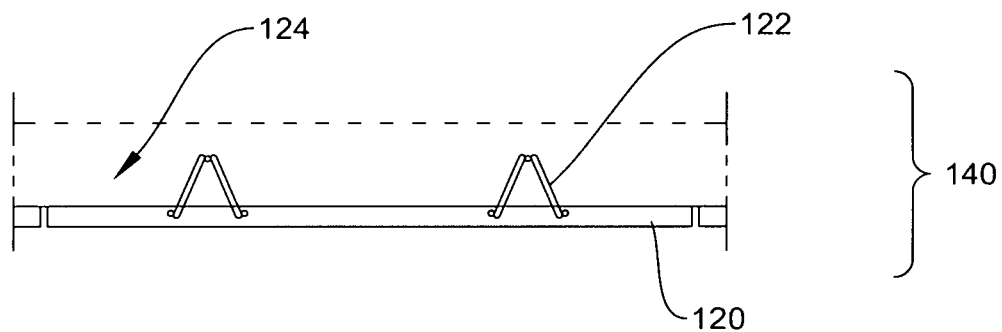
FIG. 4 is a side elevational view thereof.

As shown best in conjunction with FIG. 2, a close-up of the cross-section of the beam 110 is shown. In order to resist interface shear demand, the incorporation of hooked bars 114 along the top of each bulb 116. Shown exemplary are the use of no. 4 grade 60 hooked bars placed at 12-in. spacing, but the hooked bars 114 may be spaced to fit inside any voids of the precast UHPC truss panel 120, thereby allowing for composite connection between the beams 110 and the top slab 140. As shown in FIGS. 3 and 4, the precast UHPC deck slab 140 consists of a 1.5-in. thick precast UHPC layer 120 with two welded wire steel trusses 122 and a conventional concrete (CC) layer 124 that is placed at time of construction.

Figure 5:
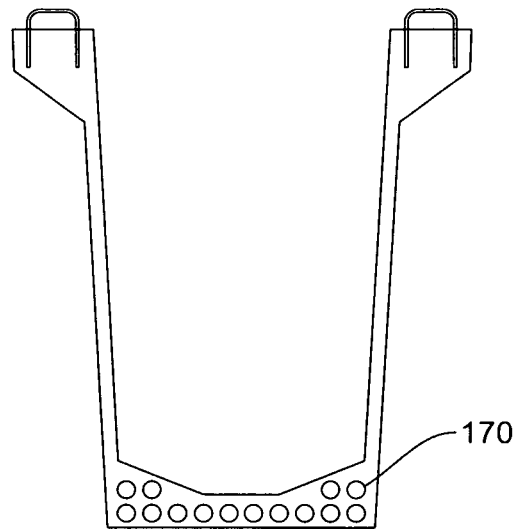
FIG. 5 is a cross sectional view of individual precast U-beam configuration of FIG. 2, shown adapted for used with a post-tensioning assembly method.
Figure 6:
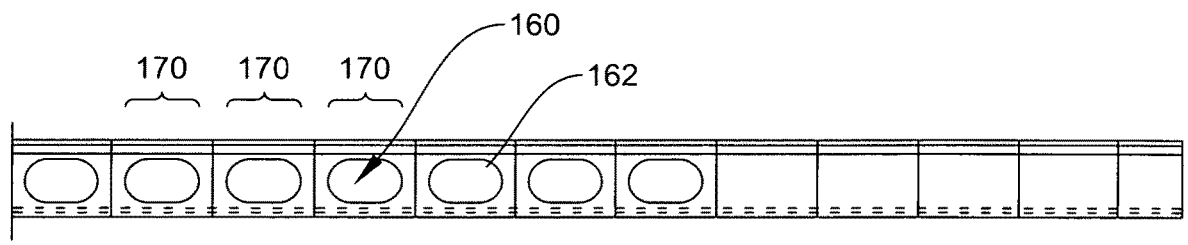
FIG. 6 is an exemplary side elevational view of the post-tensioned U-beam design thereof.
Figure 7:
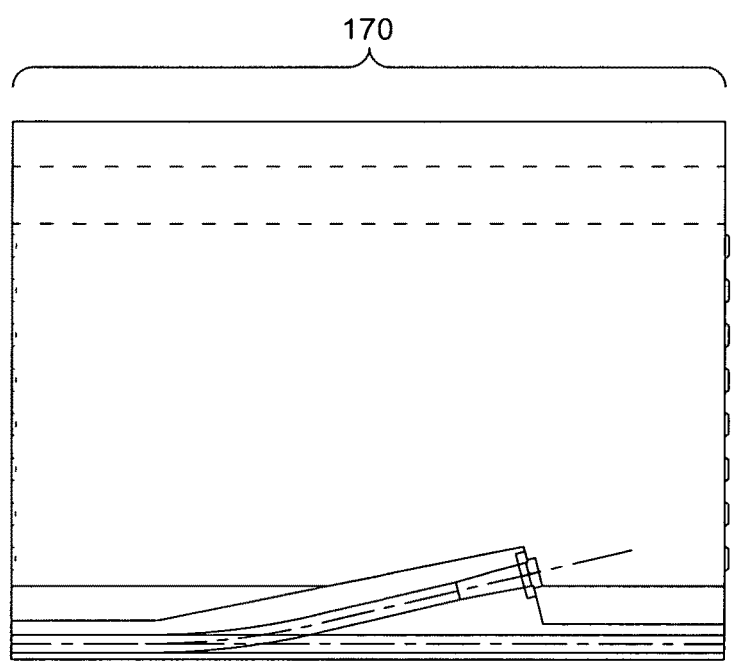
FIG. 7 is a schematic of a post-tensioning anchorage detail for use therewith.
Figure 8:
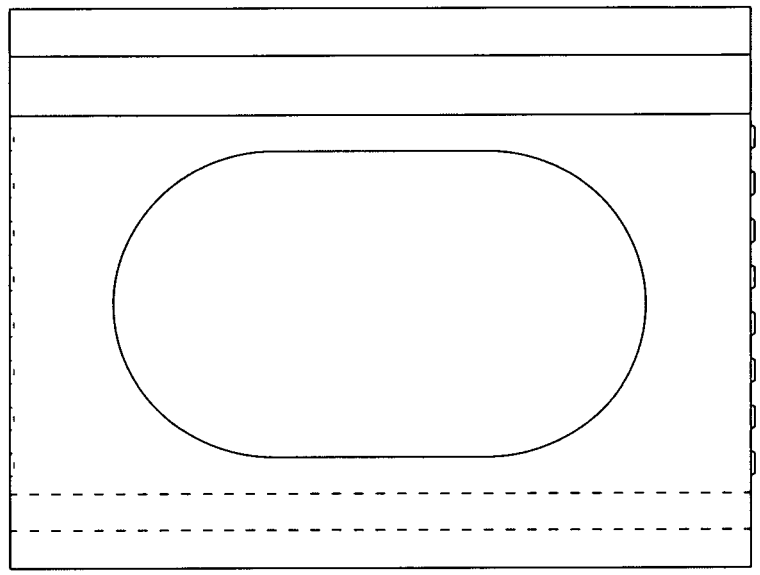
FIG. 8 is an elevational view thereof showing openings or block-outs formed in a typical UHPC Section thereof.
Figure 9:
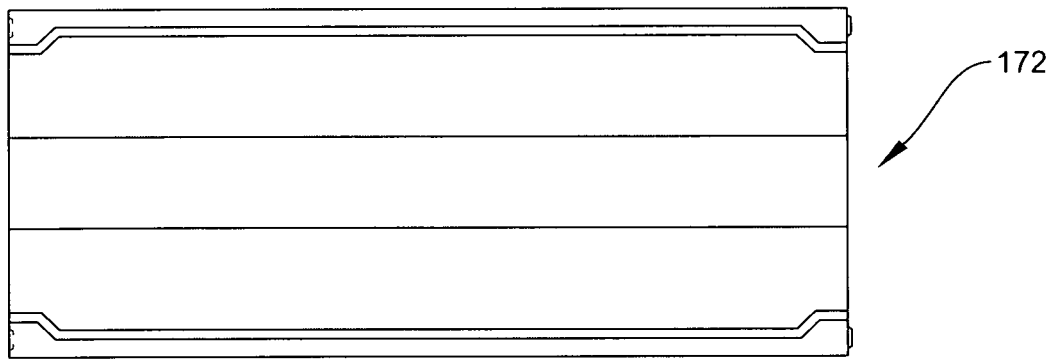
FIG. 9 detail view of a web joint for use between sections or elements.
Figure 10:
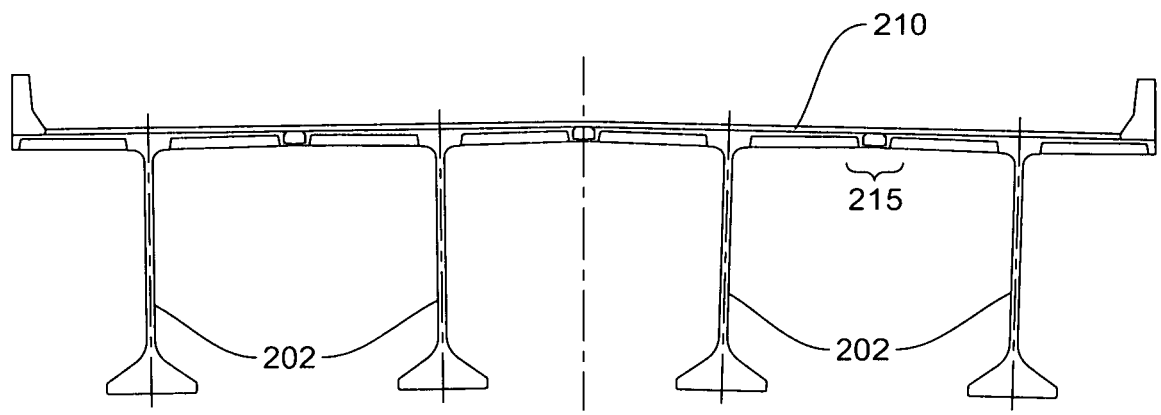
FIG. 10 is a schematic cross-sectional view of a beam bridge configuration according to a decked I-beam configuration embodiment of the present invention.

As shown best in conjunction with FIG. 5 and FIG. 6, to further optimize the shape and to minimize the self the beam and its beam loading for very long span beams such as this one, the use of the UHPC described herein allows for reduction of weight by nearly 40 percent compared to conventional concrete. To further optimize the weight, portion of the beam, such as the middle third of the beam, may form oval shaped openings 160. In one non-limiting configuration as shown, an oval shaped opening may be formed that is 6 ft 6 in. in height and 11 ft long. This is only possible with present UHPC in that fibers in the mix control the stress concentrations normally occurring near the openings. The oval openings may be placed at 15 ft centerline-to-centerline, refer to the elevation view provided in FIG. 6. These openings 160 may have large fillets 162 at the ends to control stress concentrations without having to use reinforcing bars around the openings.

Currently, there are no facilities in the US that allow for the levels of pre-tensioning shown in the 350 ft long U-beam. In order to obviate the need for creating such a facility, the present invention may allow for the beam 100 to be divided into several short segments 170 that are individually formed and post-tensioning in an aligned position to assemble them into a full-length beam 110. This allows for the strands 170 to be tensioned in groups after the individual elements 170 have been cast, assembled and affixed together. Such an assembled, segmented structure also facilitates shipping and handling of the individual beam elements 170, rather than the entire beam assembly 100. Additionally, the need for creation of a dedicated and specialized casting facility is eliminated in that many of a number of capable precasters around the US that already exist may be utilized.

Post tensioning may use and increased number of 0.6-in. diameter strands 170 instead of 0.7-in. diameter strands. In such a configuration a total of 14 tendons 170 may be provided, with each tendon containing 19 strands. In such a configuration, the 100 may be divided into multiple segments 170. Any stresses due to the post-tensioning and other load effects may accumulate at joints between segments 170. As shown in conjunction with FIG. 9, the webs 172 may be increased in order to stiffen the joints and allow for larger area for interface resistance.

Similar to the tub beam embodiment, a 350 ft span decked I-beam (DIB) bridge system, generally noted as 200, may alternately be provided as shown in conjunction with FIG. 9 through FIG. 18. Such a bridge design may use four beams 202 that are 12 ft in depth with a beam spacing of 12-ft 8-in.

Rather than using a cast-in-place deck slab or the shown composite truss panel, the deck 210 may be integrated into the beam 202. Such a configuration allows for simple and quick production.

The deck 210 may be ribbed to save on material costs, as the entire depth is not needed to obtain sufficient strength and resist transverse bending. As shown in conjunction with FIG. 12, bars 220 may be placed transversely in these ribs 215 to provide enough bending strength as well as for a joint connection. As shown in the cross section of FIG. 10, note that the transverse bars 220 are not shown in this section for clarity. Tentatively, a number of grade 60 bars may be placed in the top and bottom of each rib to allow for sufficient connection of the beams, as well as to resist any positive and negative bending of the integrated deck.

Figure 11:
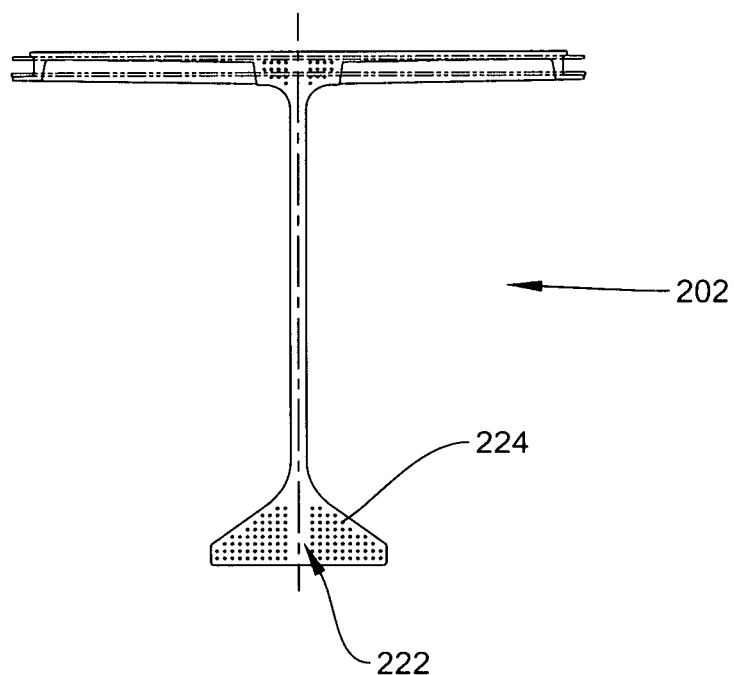
FIG. 11 is a schematic cross section view of a decked I-beam for use therewith.
Figure 12:
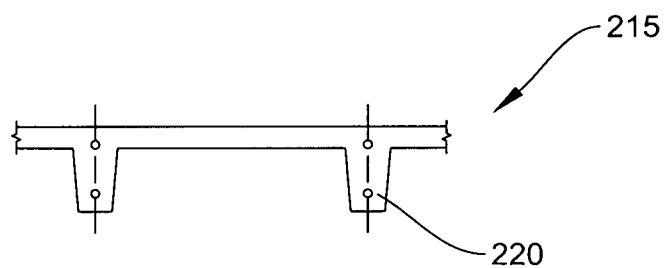
FIG. 12 is an exemplary cross-sectional view of a transfer rib for use therewith.
Figure 13:
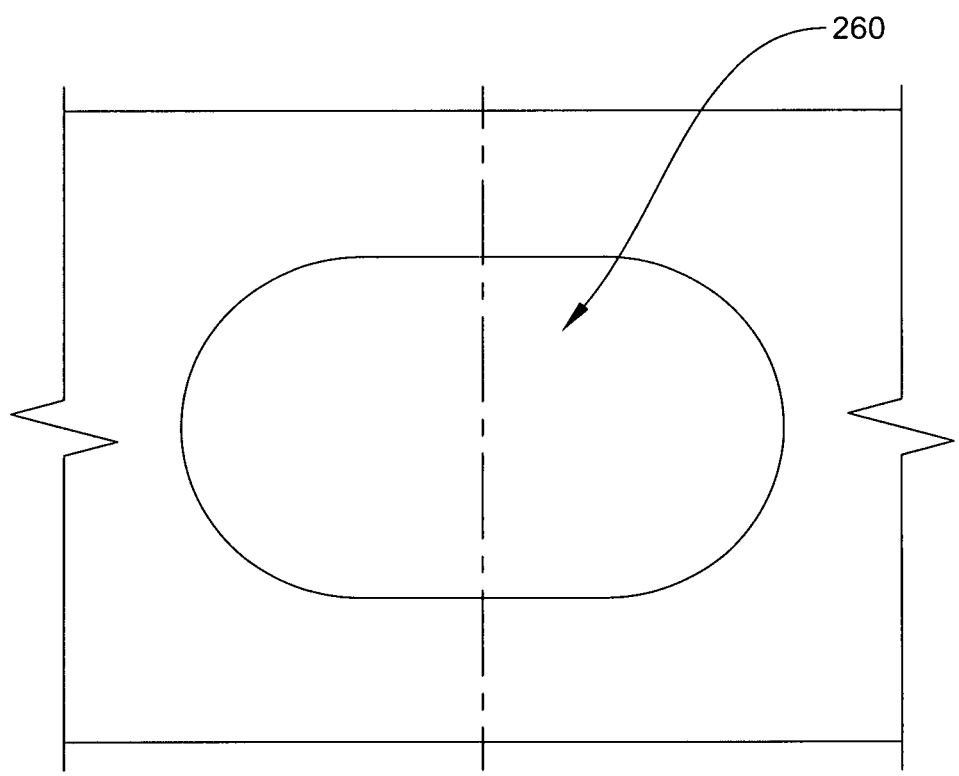
FIG. 13 is an elevational view thereof showing openings or block-outs formed in a typical UHPC Section thereof.
Figure 14:
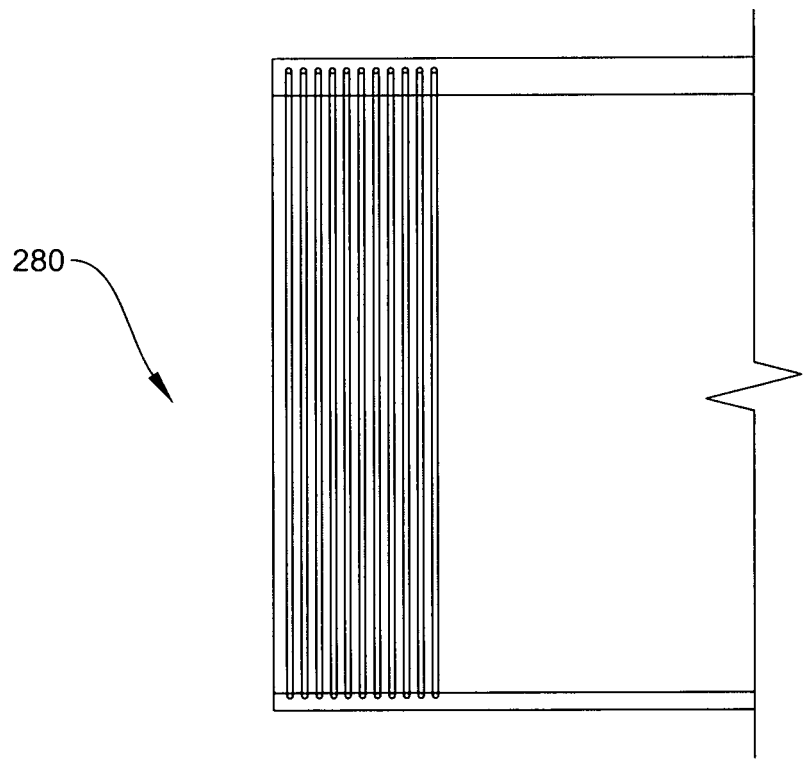
FIG. 14 is a bursting reinforcement detail of the DIB design.

A close-up of the cross section of the beam is shown in FIG. 11. Note the gap 222 between prestressing strands 224 in the center of the beam 202. This allows for the UHPC to be able to flow uninterrupted to the bottom, helping prevent any fiber bridging between the center strands 222.

To further optimize the shape of the bridge, the beam 200 may be further optimized in shape by forming oval block-outs 260 along the middle 60 percent of the length. As shown in conjunction with FIG. 13, the creation of oval block-outs 260 substantially reduces both the weight of the member and the amount of material needed. Beams of such a design may be subjected to very high prestressing forces at release. To prevent cracking of the member, a bursting reinforcement 280 may be provided as described in FIG. 14. Such a reinforcement may include steel 282 added within a distance of h/4=36 in. However, the contribution due to the fibers can be accounted for, with any such fibers assumed to be able to carry any remaining stresses.

Figure 15:
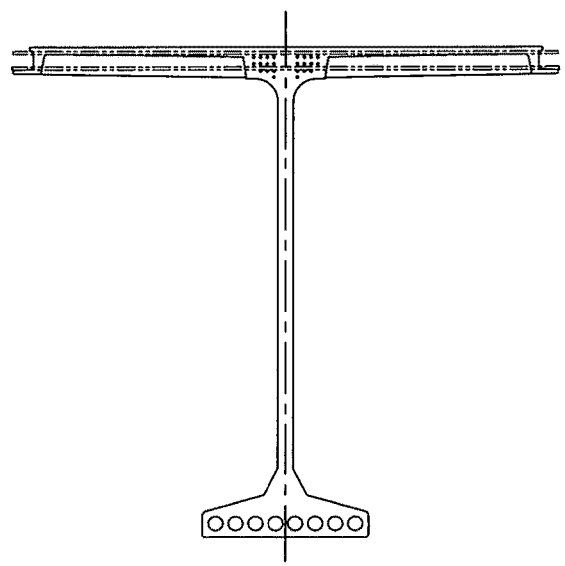
FIG. 15 is a cross sectional view of individual decked I-beam configuration of FIG. 11, shown adapted for used with a post-tensioning assembly method.
Figure 16:
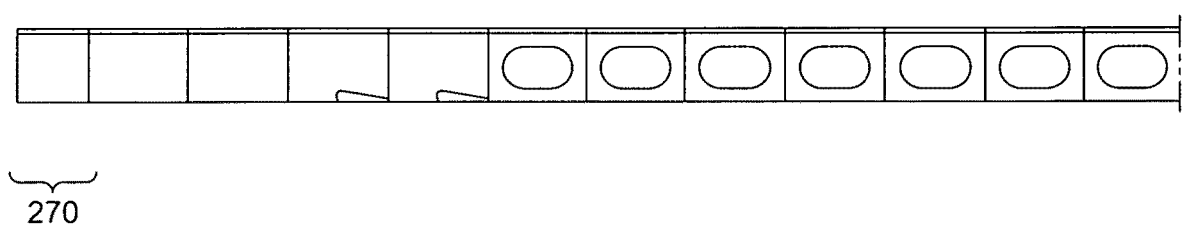
FIG. 16 is an exemplary side elevational view of the post-tensioned U-beam design thereof.
Figure 17:
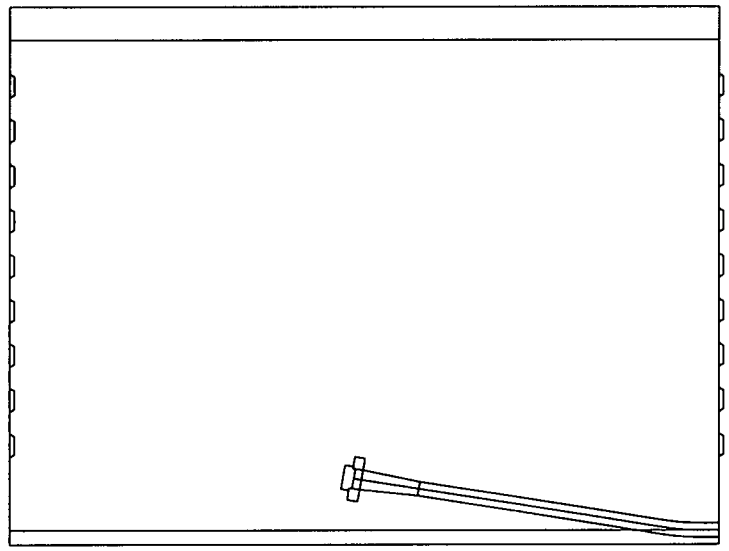
FIG. 17 is a schematic of a post-tensioning anchorage detail for use therewith.
Figure 18:
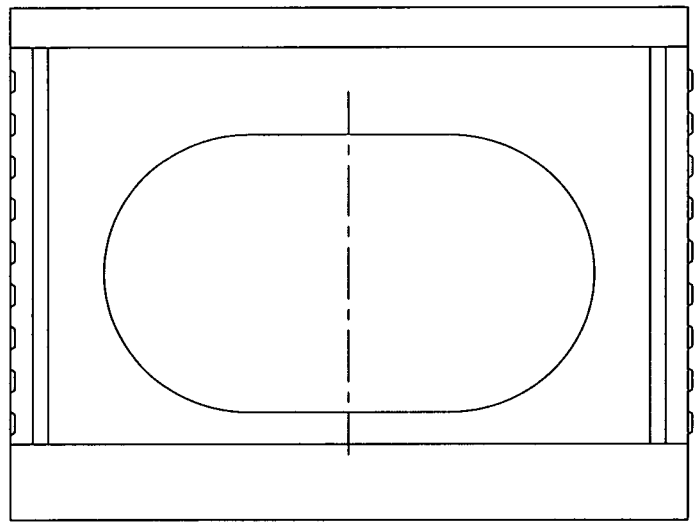
FIG. 18 is an elevational view thereof showing openings or block-outs formed in a typical UHPC Section thereof.
Figure 19:
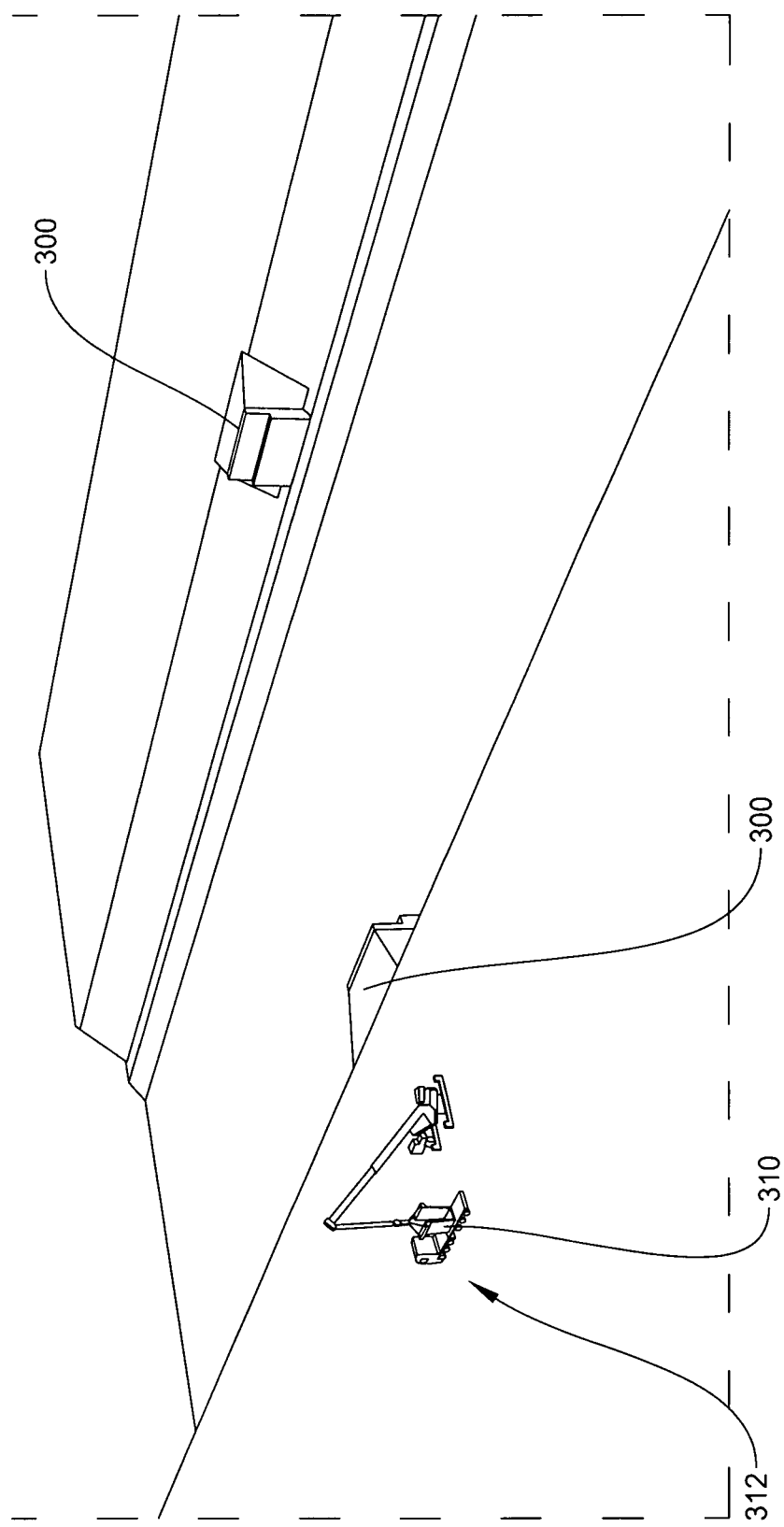
FIG. 19 through FIG. 33 are schematical representation of sequential steps of a method of erection for use with post-tensioned segments forming a long span girder according to the preferred embodiments of the present invention.

Similar to the limitations in the U-beam configuration, there are no facilities in the US that allow for the levels of pre-tensioning shown in the 350 ft long decked I-beam. Therefore, a post-tensioning system may be provided as shown in conjunction with FIG. 15 through FIG. 18. Similar to the system that is used with the U-beam configuration above, the use of post-tensioning strands may be tensioned in groups after individual beam elements 270 may be cast separately and then assembled together. A major benefit of this system is that the beam can be made in several smaller pieces, allowing for easier shipping and handling, and for lower manufacturing risk and more availability of qualified precasters. FIG. 17 shows placement of post-tensioning ducts and the post-tensioning anchorage in a modified section as shown in FIG. 15. Tendon may be placed at one end and run continuous through the whole length of the beam. Another set may be further added as regular intervals ft from each end. As noted in FIG. 18, the post-tensioning anchorage, the inside of the ducts from voids that may be provided to be modular in each section of the beam.

2. Operation of the Preferred Embodiment

Figure 20:
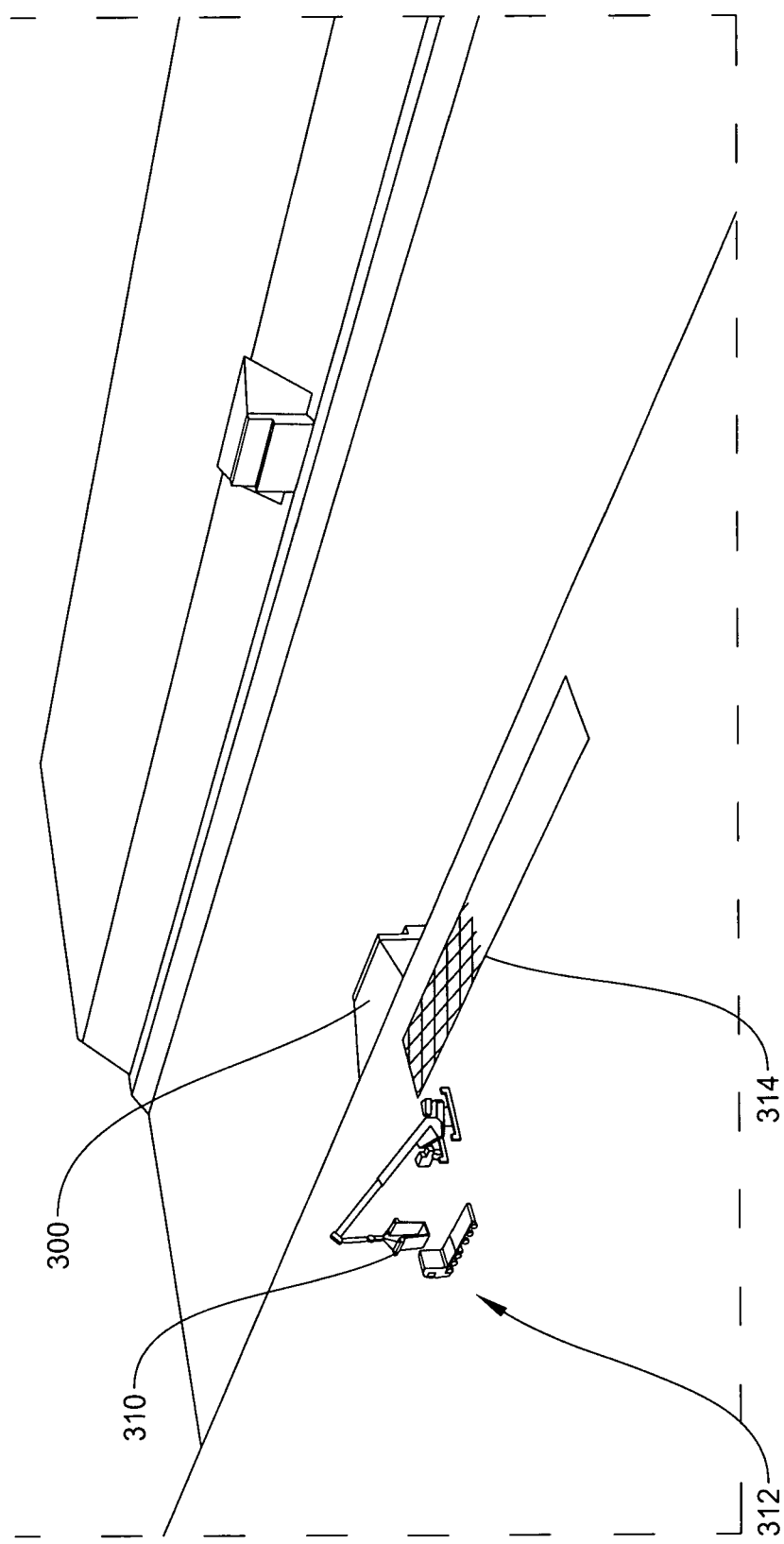
Figure 21:
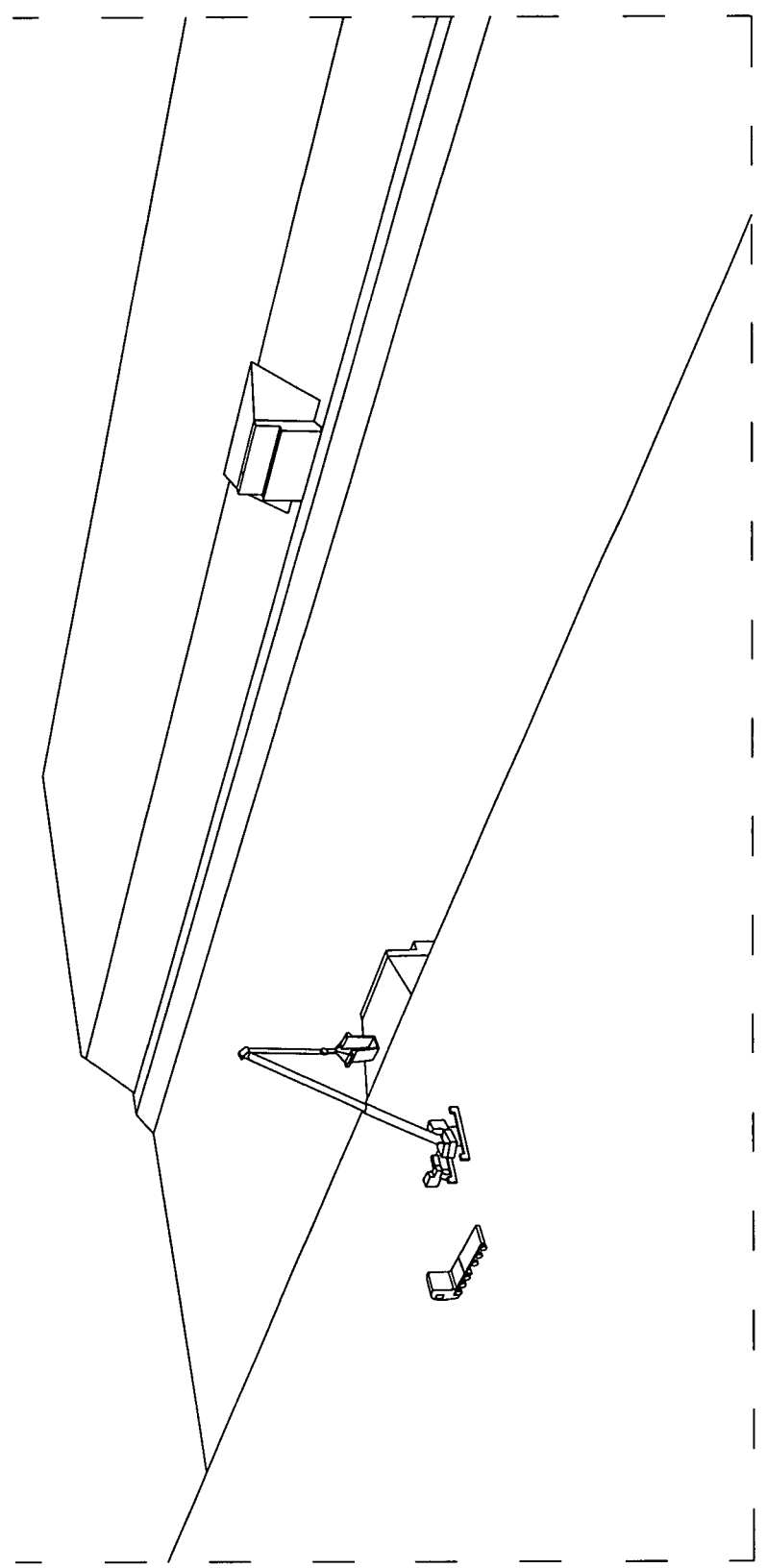
Figure 22:
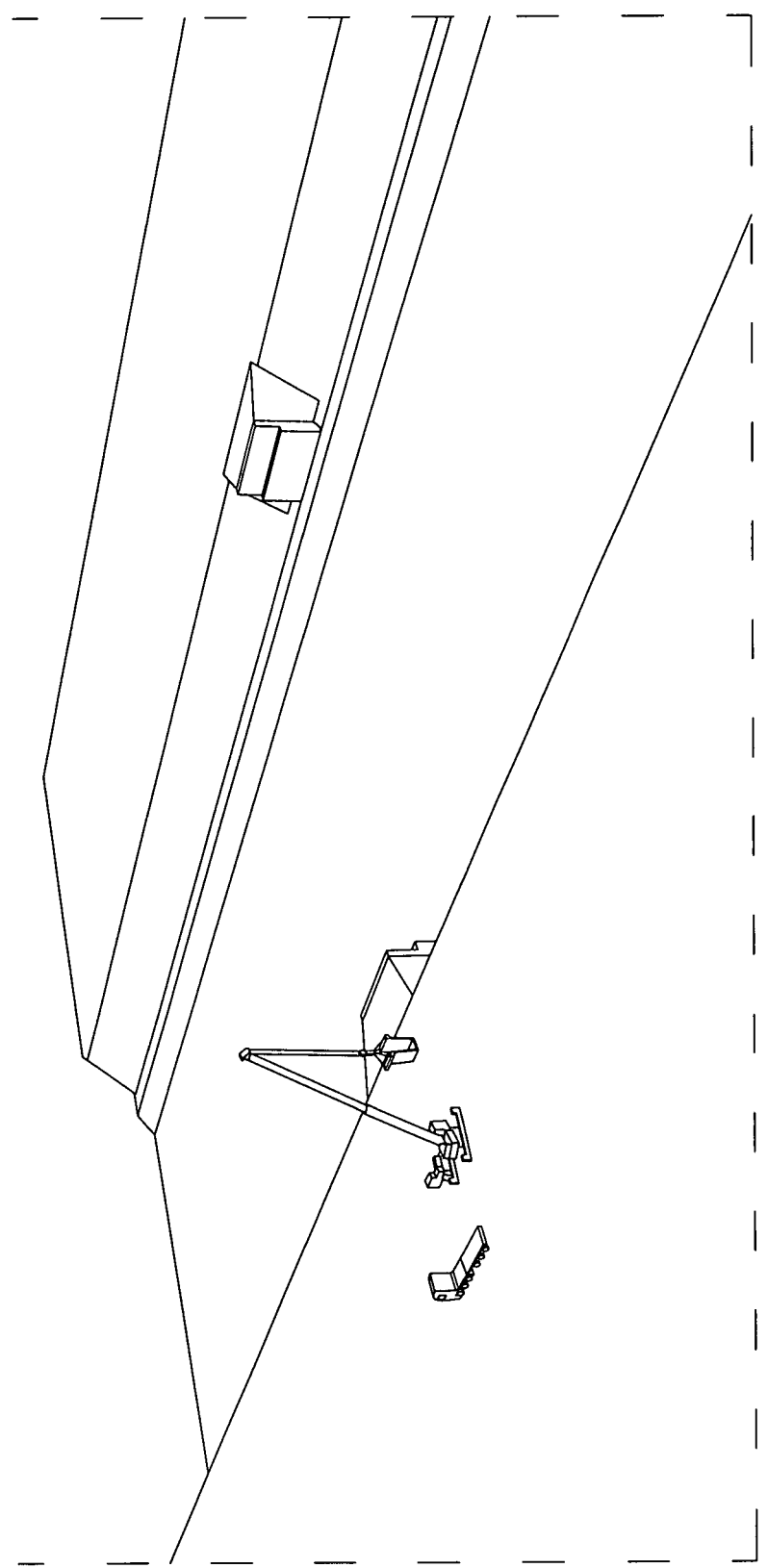
Figure 23:
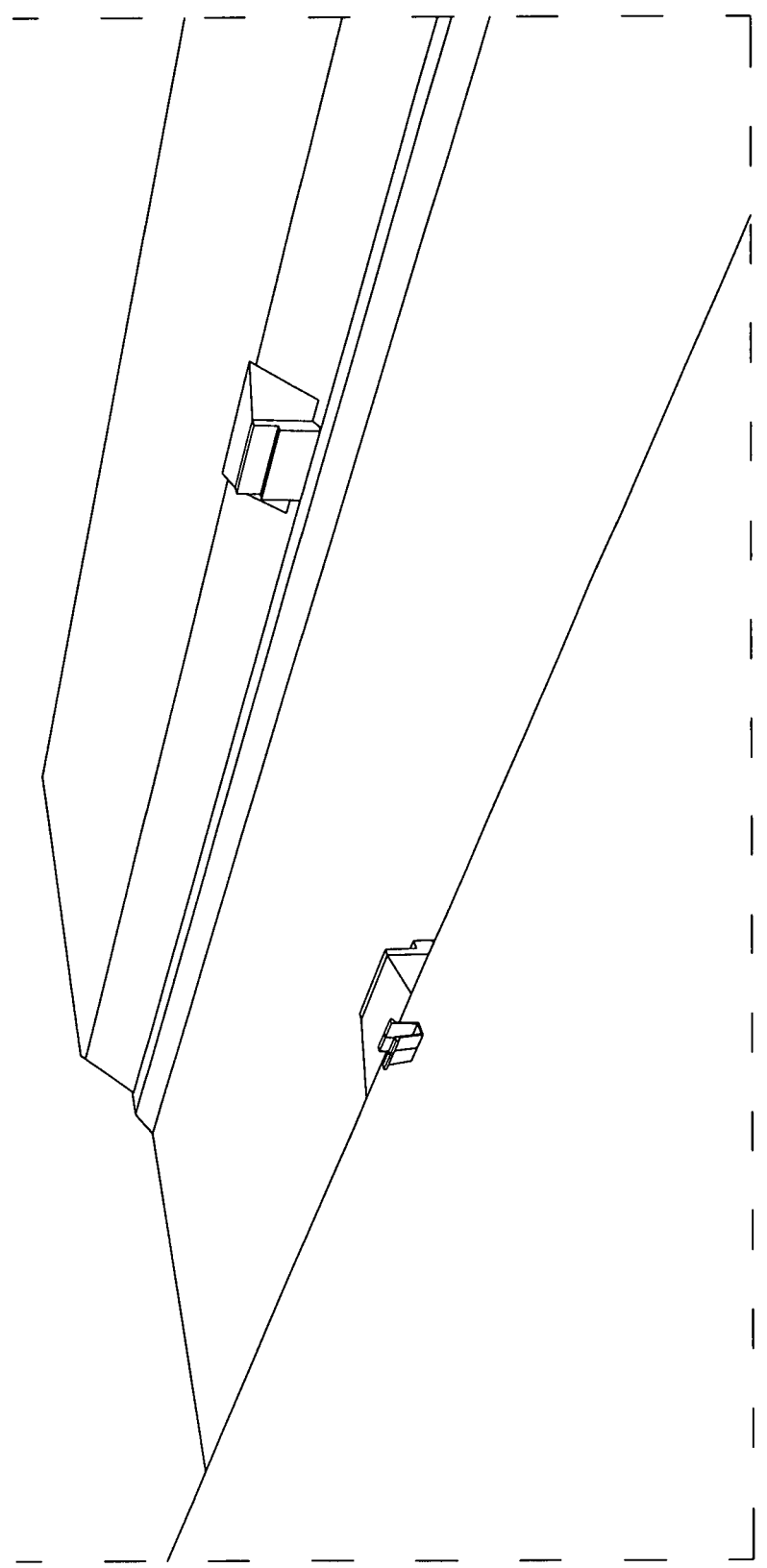
Figure 24:
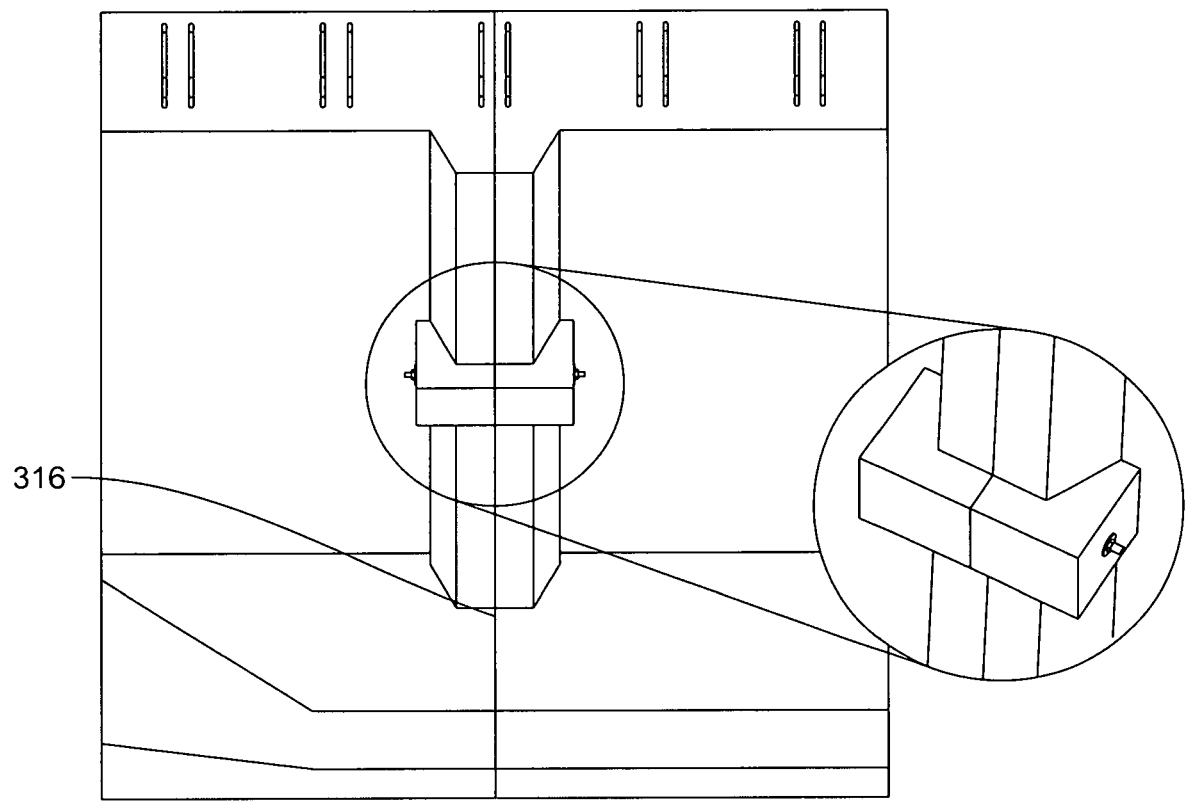
Figure 25:
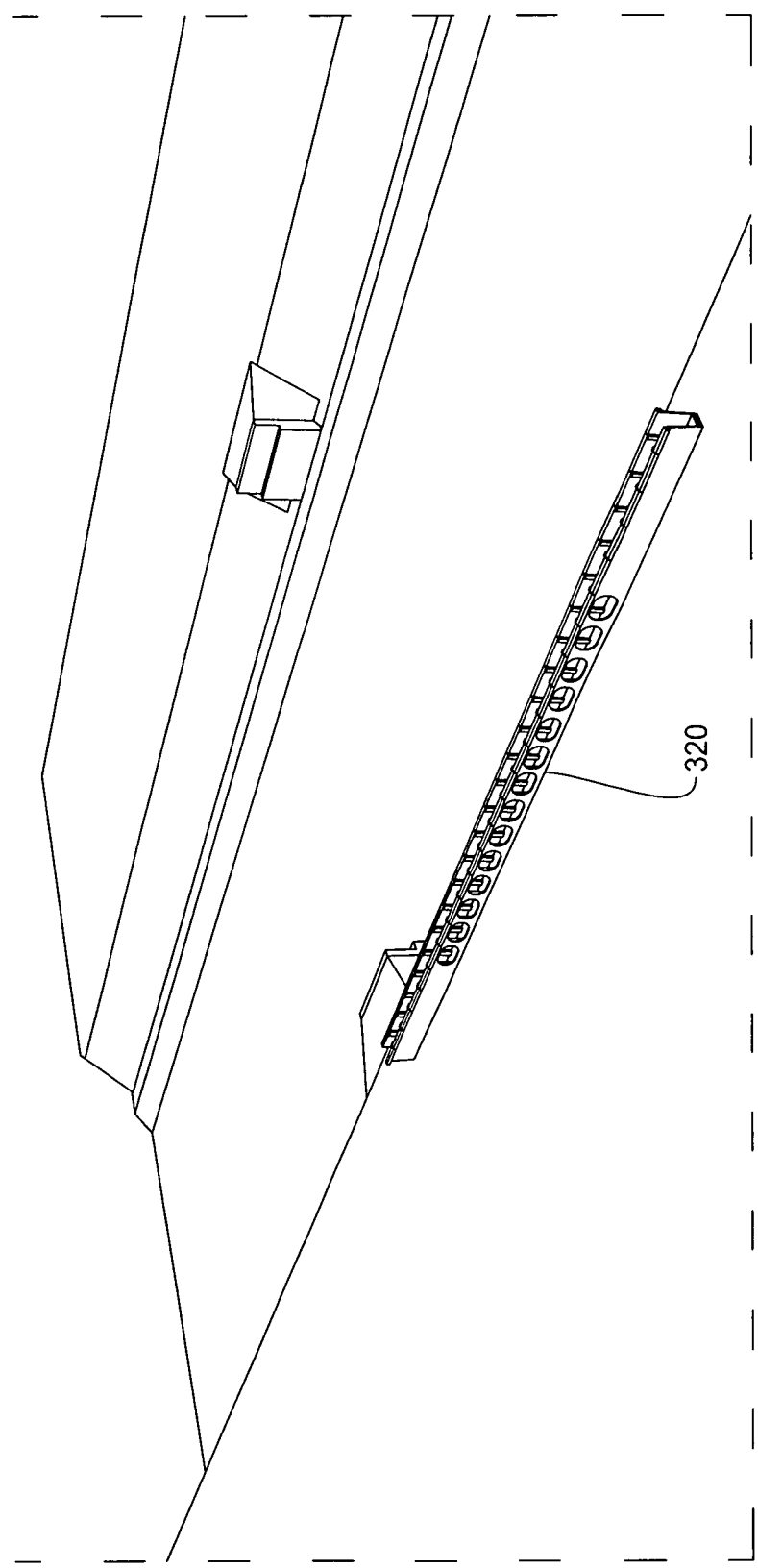
Figure 26:
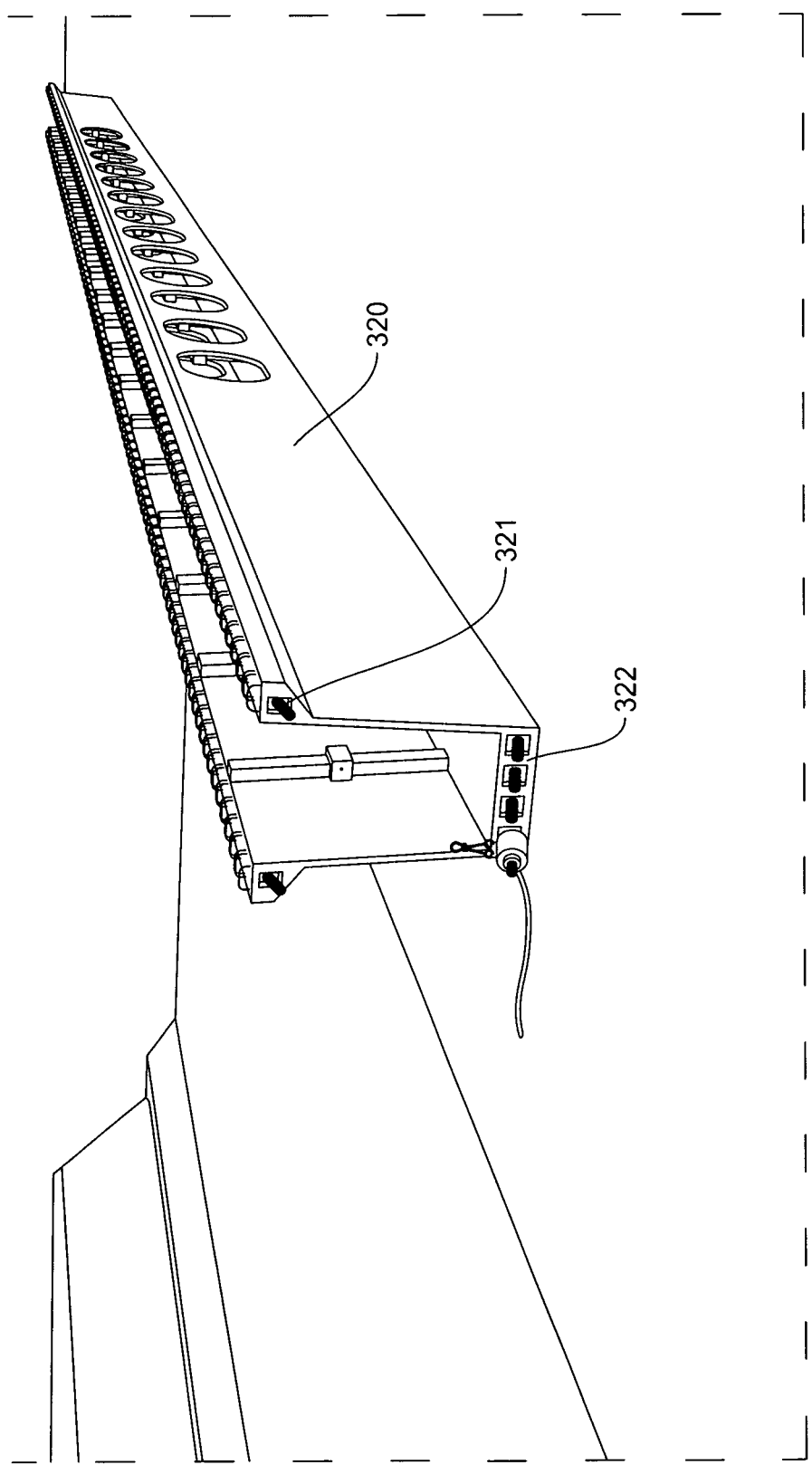
Figure 27:
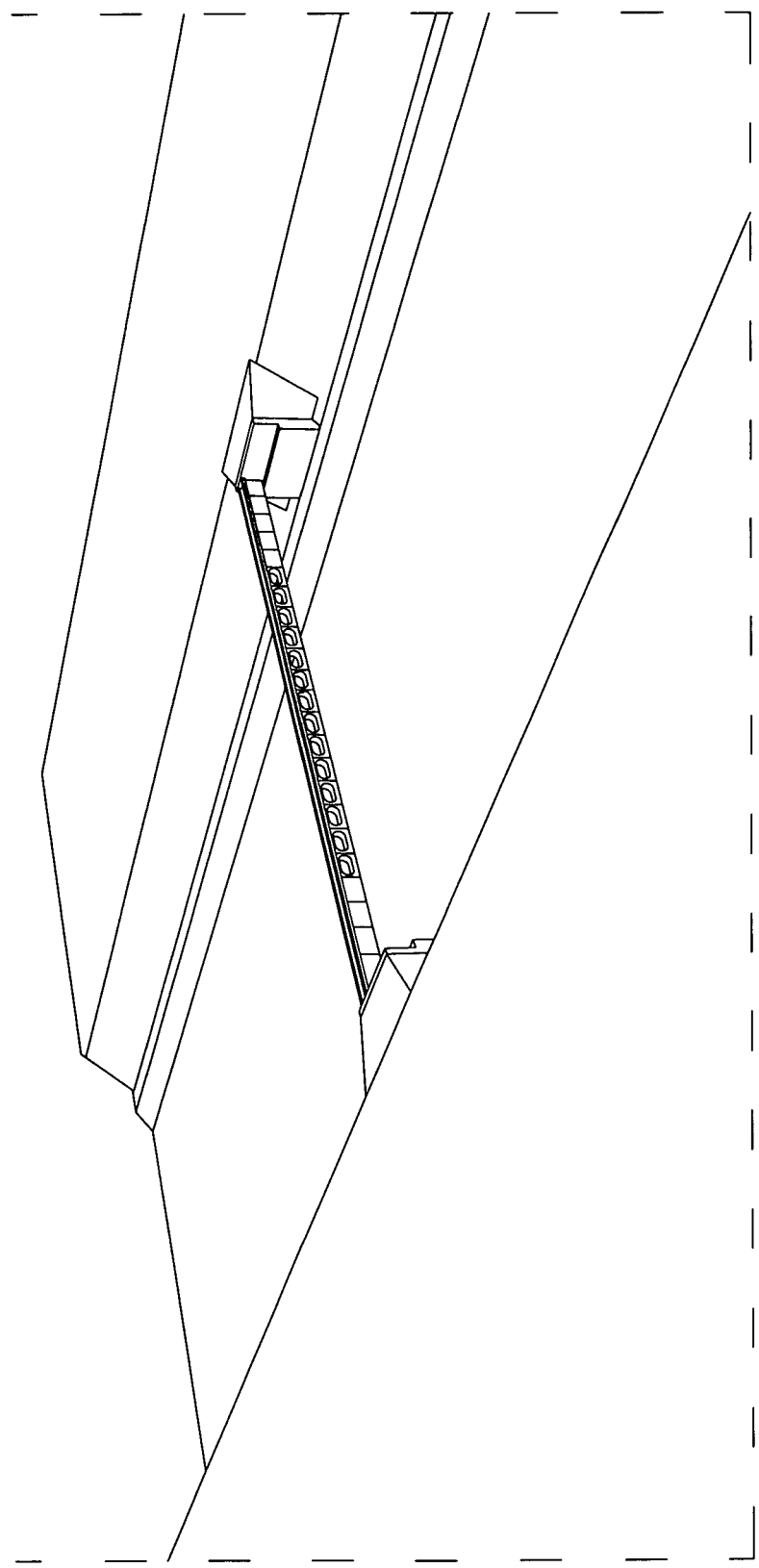

As shown best in conjunction with FIG. 19 through FIG. 33, the erection of long span beams may be provided using segmented modular elements to assembly a completed beam through post-tensioning. Used with either the U-beam or decked !-beam designs, abutments 300 may first be constructed. Individual beam elements 310 may then be moved to the erection location by rail or truck 312 and unloaded to a staging location 314 (FIG. 20). As individual beam elements 310 are aligned, the segments may be assembled at the project site (FIG. 21 through FIG. 25). Successive elements 310 are aligned and epoxy grout 316 may be applied at each successive joint between beam elements. Compression about each joint may be applied to insure the application of the epoxy to the joint. Once all elements are assembled into a long span beam 320, post-tensioning strands 322 may be inserted through the beam 320 in a manner that post-tensioning forces may be applied to the assembled beam 320 (FIG. 26). The beam 320 may then be erected into position onto the abutment (FIG. 27).

Figure 28:
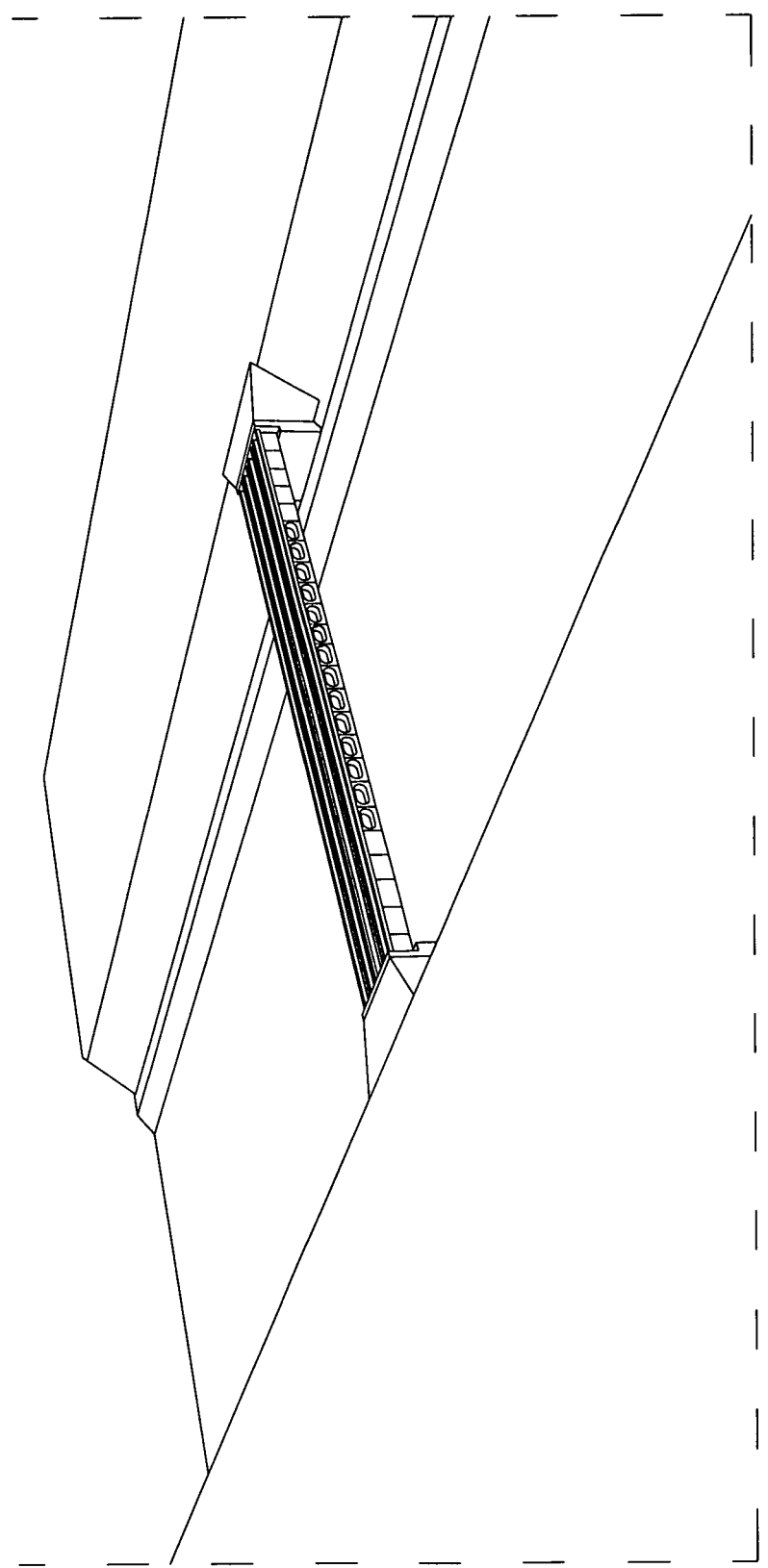
Figure 29:
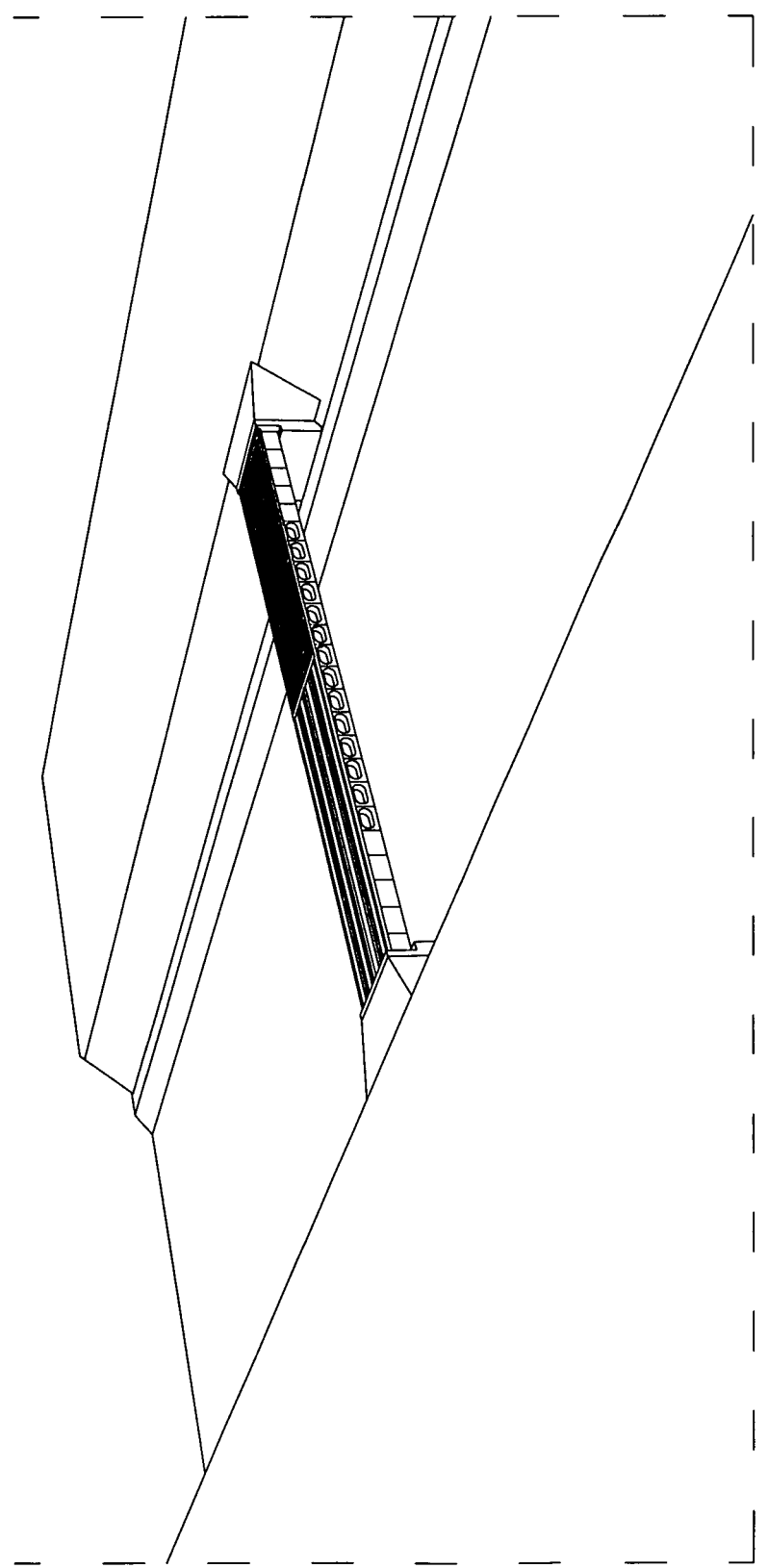
Figure 30:
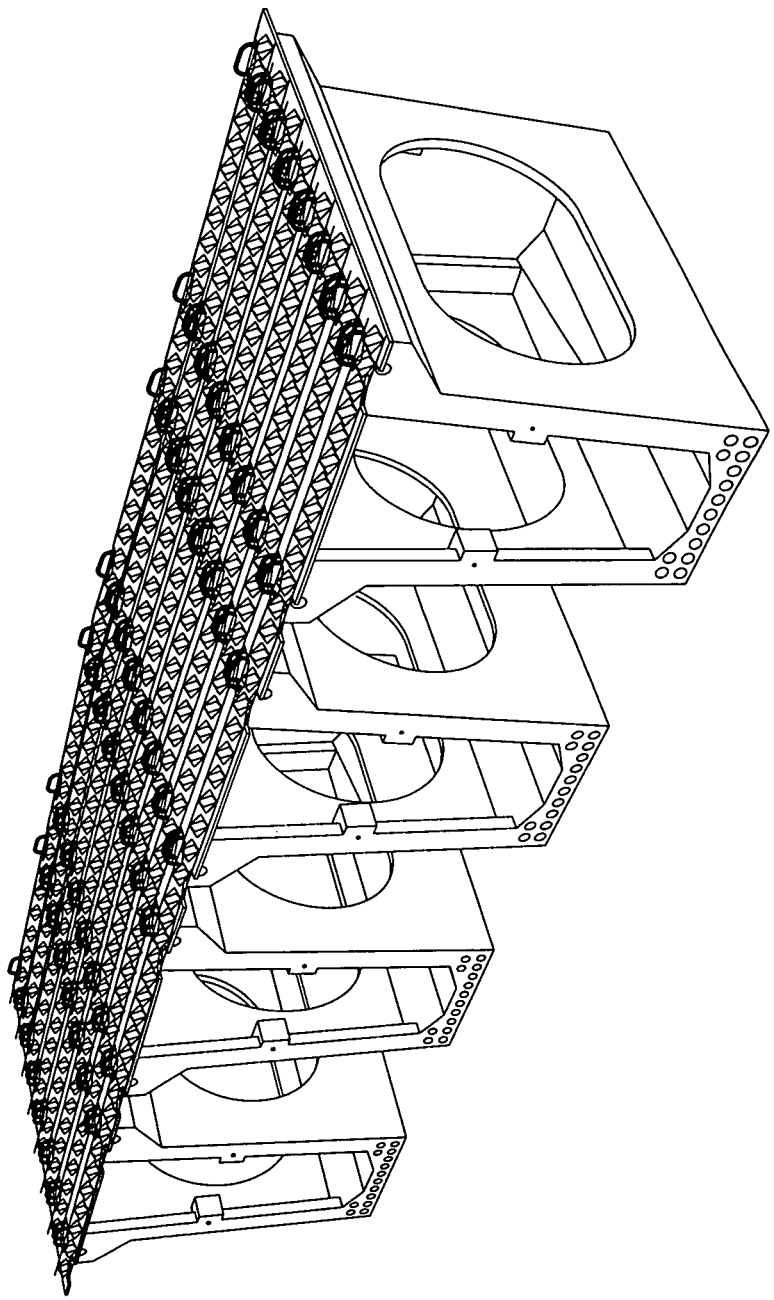
Figure 31:
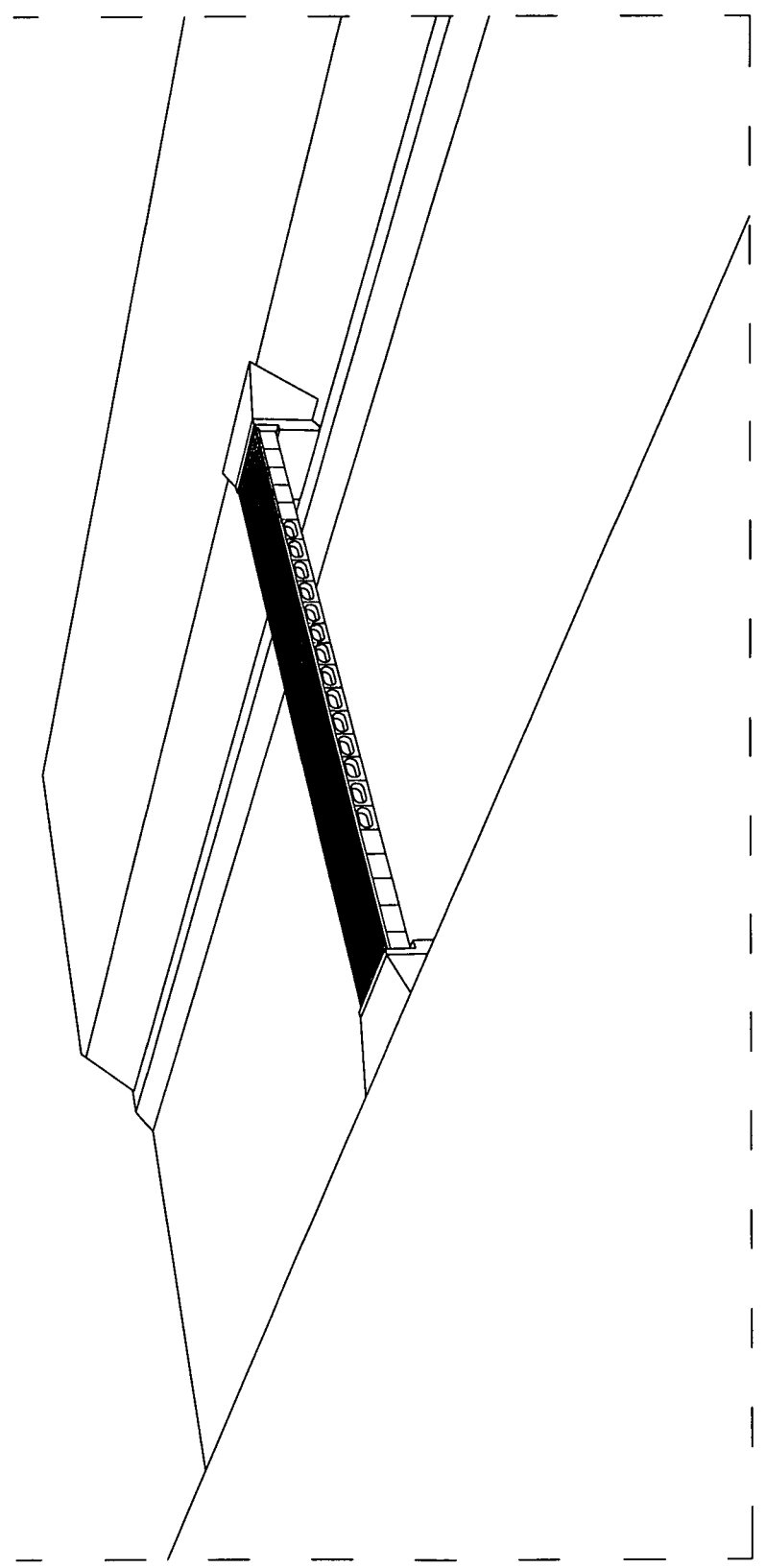
Figure 32:
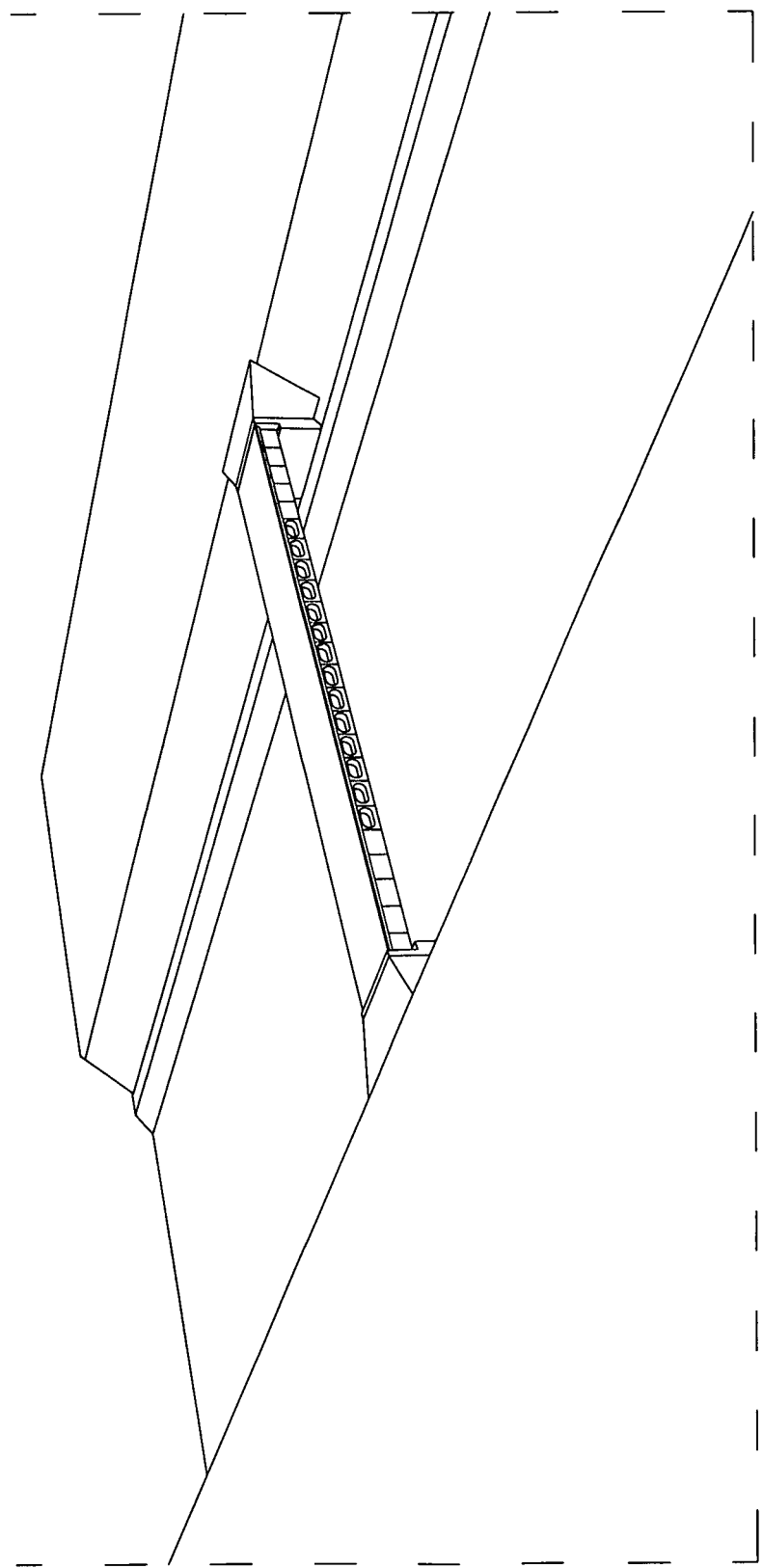
Figure 33:
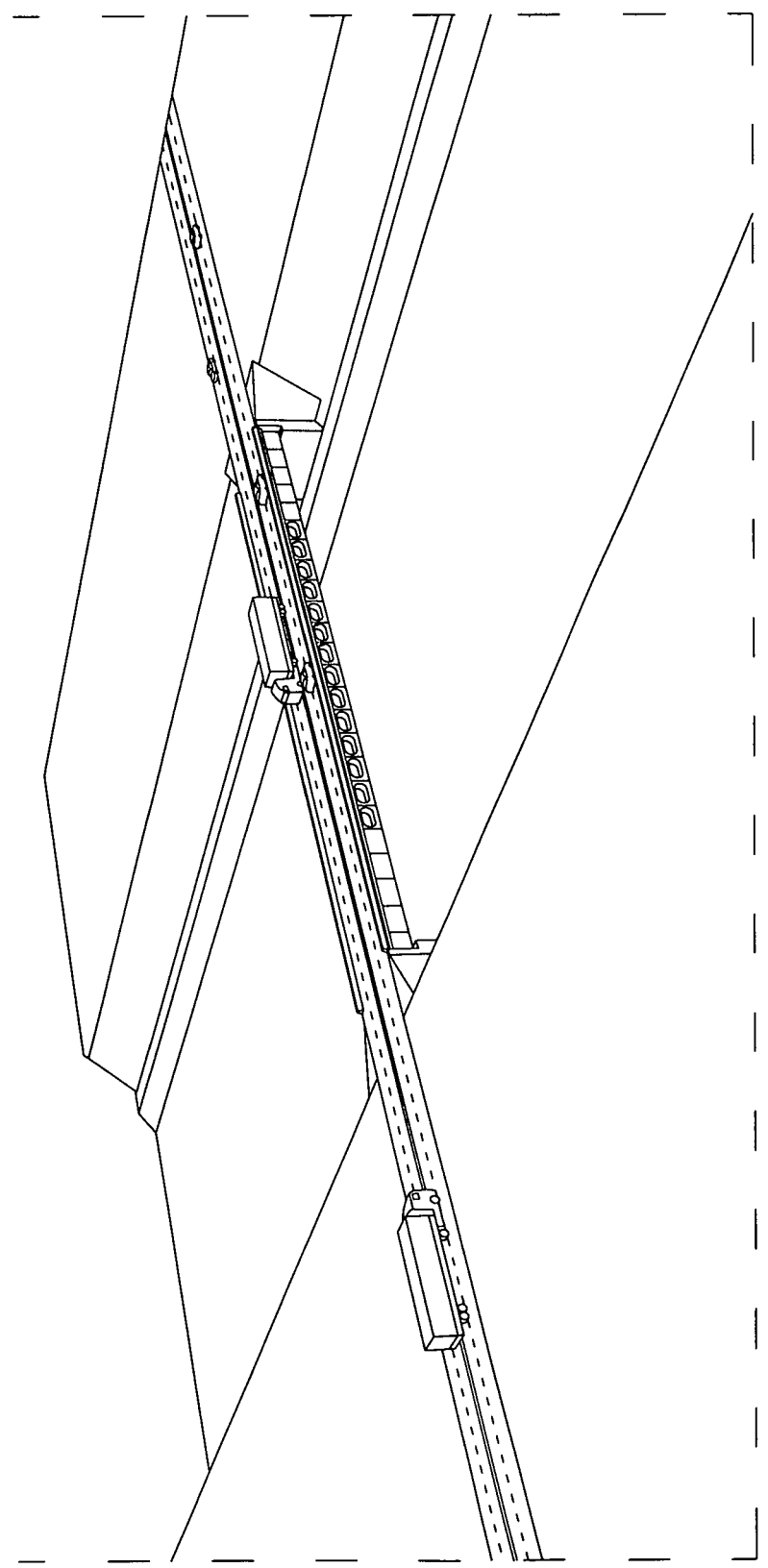

As shown in conjunction with FIG. 28, the remaining beams may then be erected in a similar manner. Once installed, the UHPC stay-in-place forms may then be erected (FIG. 29 through FIG. 31), wherein the concrete topping may then be cast in a generally conventional manner (FIG. 32). As shown in conjunction with FIG. 33, the present invention may allow for the spanning of longer than conventional distances in a manner that minimizes the number of abutments or other supports that are required. Such large services span may further be achieved with additional support.

It should be apparent to those having ordinary skill in the relevant art, in light of the present teachings, that a number of modifications and variations may exist to the configuration(s) described. It should also be understood that utilizing an effective long span, wide flanged, prestressed girder may be provided for the construction of long span applications such as bridges or the like. By providing such beams, bridges or similar structure may be constructed using precast concrete beams in accordance with the present invention that allows for longer bridge spans and/or a reduced number of beams to support a particular structure. Each beam is lighter for a particular span length than other available configurations, and with a design that allows for a less complicated installation. Further, the beam geometry facilitates inspection, validation, maintenance and the like.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents.

What is claimed is:

1. A beam for use in construction of a long span bridge structure comprising:
   a reinforcing member formed of a plurality of aligned modular elements and having a geometric configuration selected from a group consisting of: a "U" tub beam with composite deck system; and a decked I-beam; and
   each of said plurality of aligned modular elements each further comprises a prestressed beam cast from a ultra-high performance concrete (UHPC) mix as a unitary body;
   said UHPC is configuration to have:
      an initial compressive strength, f'ci=10.0 ksi;
      a compressive strength at service, f'c=17.4 ksi;
      a modulus of elasticity of concrete, Ec=6500 ksi;
      a residual rupture stress, frr=0.75 ksi; and
      a concrete unit weight, wc=0.155 kcf;
   said ultra-high performance concrete mixture further comprises:
      cement at about 24.5% by weight;
      silica flume at about 4.5% by weight;
      limestone powder at about 7.6% by weight;
      slag at about 13.0% by weight;
      masonry sand at about 39% by weight;
      water at about 4% by weight;
      ice at about 4% by weight;
      a shrinkage reducing admixture at less than 2% by weight; and
      a workability retaining admixture at less than 0.5% by weight;
   said UHPC mix further comprises a plurality of discontinuous fibers distributed randomly throughout a concrete matrix, said plurality of discontinuous fibers formed of a material selected from the group consisting of: steel; polypropylene; nylon; polyvinyl alcohol; polyolefin; polyethylene; polyester; acrylic; aramid; carbon; silica glass; basalt glass; glass fiber-reinforced polymer; and basalt fiber-reinforced polymer; and
   said plurality of aligned modular elements are connected by an epoxy grout adhering as element joints and post-tensioned to form the reinforcing member.

2. The beam of claim 1, wherein said plurality of discontinuous fibers each form a reinforcing strand further comprising:
   a diameter of between about 0.5-inch and about 2.0-inches; and
   a length of between about ½ inch to about 5 inches.

3. A beam, for use in construction of a long span bridge structure comprising:
   a reinforcing member formed of a plurality of aligned modular elements and having a geometric configuration selected from a group consisting of: a "U" tub beam with composite deck system; and a decked I-beam; and
   each of said plurality of aligned modular elements each further comprises a prestressed beam cast from a UHPC mix as a unitary body;
   said UHPC is configuration to have:
      an initial compressive strength, $f'_{ci}$=10.0 ksi;
      a compressive strength at service, $f'_c$=17.4 ksi;
      a modulus of elasticity of concrete, $E_c$=6500 ksi;
      a residual rupture stress, $f_{rr}$=0.75 ksi; and
      a concrete unit weight, $w_c$=0.155 kcf;
   said UHPC mix further comprises a plurality of discontinuous fibers distributed randomly throughout a concrete matrix, said plurality of discontinuous fibers formed of a material selected from the group consisting of: steel; polypropylene; nylon; polyvinyl alcohol; polyolefin; polyethylene; polyester; acrylic; aramid; carbon; silica glass; basalt glass; glass fiber-reinforced polymer; and basalt fiber-reinforced polymer; and
   said plurality of aligned modular elements are connected by an epoxy grout adhering as element joints and post-tensioned to form the reinforcing member, wherein said cement is selected from a group consisting of: Portland cement; and blended cements including mineral admixtures or blends calcium aluminate cements, calcium sulfoaluminate cements, alkali-activated binders, supersulfated slag cements;
   wherein the UHPC mix further comprises a mixture of:
      cement;
      silica flume;
      limestone;
      slag;
      masonry sand;
      water;
      ice;
      a shrinkage reducing admixture; and
      a workability retaining admixture;
   wherein said cement is selected from a group consisting of: Portland cement; and blended cements including mineral admixtures or blends calcium aluminate cements, calcium sulfoaluminate cements, alkali-activated binders, supersulfated slag cements;
   wherein said ultra-high performance concrete mixture further comprises:
      cement at about 24.5% by weight;
      silica flume at about 4.5% by weight;
      limestone powder at about 7.6% by weight;
      slag at about 13.0% by weight;
      masonry sand at about 39% by weight;
      water at about 4% by weight;
      ice at about 4% by weight;
      a shrinkage reducing admixture at less than 2% by weight; and
      a workability retaining admixture at less than 0.5% by weight.

4. The beam of claim 3, wherein said cement is selected from a group consisting of: Portland cement; and blended cements including mineral admixtures or blends calcium aluminate cements, calcium sulfoaluminate cements, alkali-activated binders, supersulfated slag cements, and wherein said ultra-high performance concrete mixture further comprises:
   cement at about 24.5% by weight;
   silica flume at about 4.5% by weight;
   limestone powder at about 7.6% by weight;
   slag at about 13.0% by weight;
   masonry sand at about 39% by weight;
   water at about 4% by weight;
   ice at about 4% by weight;
   a shrinkage reducing admixture at less than 2% by weight; and
   a workability retaining admixture at less than 0.5% by weight;
wherein said cement is selected from a group consisting of: Portland cement; and blended cements including mineral admixtures or blends calcium aluminate cements, calcium sulfoaluminate cements, alkali-activated binders, supersulfated slag cements.

5. A method of erecting a long span bridge beam comprising:
- a. obtaining a plurality of segmented modular elements each comprising:
  - a geometric configuration selected from a group consisting of: a "U" tub beam with composite deck system; and a decked I-beam; and
  - each of said plurality of aligned modular elements each further comprises a prestressed beam cast from a UHPC mix as a unitary body;
  - said UHPC is configuration to have:
    - an initial compressive strength, f'ci=10.0 ksi;
    - a compressive strength at service, f'c=17.4 ksi;
    - a modulus of elasticity of concrete, Ec=6500 ksi;
    - a residual rupture stress, frr=0.75 ksi; and
    - a concrete unit weight, wc=0.155 kcf;
  - said UHPC mix further comprises a plurality of discontinuous fibers distributed randomly throughout a concrete matrix, said plurality of discontinuous fibers formed of a material selected from the group consisting of: steel; polypropylene; nylon; polyvinyl alcohol; polyolefin; polyethylene; polyester; acrylic; aramid; carbon; silica glass; basalt glass; glass fiber-reinforced polymer; and basalt fiber-reinforced polymer; and
  - said plurality of aligned modular elements are connected by an epoxy grout adhering as element joints and post-tensioned to form the reinforcing member;
- b. moving the plurality of segmented modular elements to an erection location by rail or truck and unloaded to a staging location;
- c. aligning the plurality of segmented modular elements at the project site;
- d. attaching adjacent modular elements by applying an epoxy grout at each joint between each successive joint and applying compression about each joint to assure curing of the epoxy to the joint;
- e. once all elements are assembled into a long span beam, inserting post-tensioning strands through the beam in a manner that post-tensioning forces are applied to the assembled beam; and
- f. erecting the assembled beam into a final position.

6. The method of claim 5, further comprising:
- g. installing a UHPC stay-in-place form to create a topping form; and
- h. casting a bridge deck onto the topping form.

7. A method of erecting a long span bridge beam comprising:
- a. obtaining a plurality of segmented modular elements each comprising:
  - a geometric configuration selected from a group consisting of: a "U" tub beam with composite deck system; and a decked I-beam; and
  - each of said plurality of aligned modular elements each further comprises a prestressed beam cast from a UHPC mix as a unitary body;
  - said UHPC is configuration to have:
    - an initial compressive strength, f'ci=10.0 ksi;
    - a compressive strength at service, f'c=17.4 ksi;
    - a modulus of elasticity of concrete, Ec=6500 ksi;
    - a residual rupture stress, frr=0.75 ksi; and
    - a concrete unit weight, wc=0.155 kcf;
  - said UHPC mix further comprises a plurality of discontinuous fibers distributed randomly throughout a concrete matrix, said plurality of discontinuous fibers formed of a material selected from the group consisting of: steel; polypropylene; nylon; polyvinyl alcohol; polyolefin; polyethylene; polyester; acrylic; aramid; carbon; silica glass; basalt glass; glass fiber-reinforced polymer; and basalt fiber-reinforced polymer;
  - said plurality of discontinuous fibers each form a reinforcing strand further comprising:
    - a diameter of between about 0.5-inch and about 2.0-inches; and
    - a length of between about ½ inch to about 5 inches; and
  - said plurality of aligned modular elements are connected by an epoxy grout adhering as element joints and post-tensioned to form the reinforcing member;
- b. moving the plurality of segmented modular elements to an erection location by rail or truck and unloaded to a staging location;
- c. aligning the plurality of segmented modular elements at the project site;
- d. attaching adjacent modular elements by applying an epoxy grout at each joint between each successive joint and applying compression about each joint to assure curing of the epoxy to the joint;
- e. once all elements are assembled into a long span beam, inserting post-tensioning strands through the beam in a manner that post-tensioning forces are applied to the assembled beam; and
- f. erecting the assembled beam into a final position.

8. The method of claim 7, further comprising:
- g. installing a UHPC stay-in-place form to create a topping form; and
- h. casting a bridge deck onto the topping form.

9. A method of erecting a long span bridge beam comprising:
- a. obtaining a plurality of segmented modular elements of claim 5 wherein said ultra-high performance concrete mixture further comprises:
  - a reinforcing member formed of a plurality of aligned modular elements and having a geometric configuration selected from a group consisting of: a "U" tub beam with composite deck system; and a decked I-beam; and
  - each of said plurality of aligned modular elements each further comprises a prestressed beam cast from a UHPC mix as a unitary body;
  - said UHPC is configuration to have:
    - an initial compressive strength, $f'_{ci}$=10.0 ksi;
    - a compressive strength at service, $f'_c$=17.4 ksi;
    - a modulus of elasticity of concrete, $E_c$=6500 ksi;
    - a residual rupture stress, $f_{rr}$=0.75 ksi; and
    - a concrete unit weight, $w_c$=0.155 kcf;
  - said UHPC mix further comprises a plurality of discontinuous fibers distributed randomly throughout a concrete matrix, said plurality of discontinuous fibers formed of a material selected from the group consisting of: steel; polypropylene; nylon; polyvinyl alcohol; polyolefin; polyethylene; polyester; acrylic; aramid; carbon; silica glass; basalt glass; glass fiber-reinforced polymer; and basalt fiber-reinforced polymer; and
  - said plurality of aligned modular elements are connected by an epoxy grout adhering as element joints and post-tensioned to form the reinforcing member;
- wherein the UHPC mix further comprises a mixture of
  - cement at about 24.5% by weight;
  - silica flume at about 4.5% by weight;

limestone powder at about 7.6% by weight;
slag at about 13.0% by weight;
masonry sand at about 39% by weight;
water at about 4% by weight;
ice at about 4% by weight;
a shrinkage reducing admixture at less than 2% by weight; and
a workability retaining admixture at less than 0.5% by weight;

b. moving the plurality of segmented modular elements to an erection location by rail or truck and unloaded to a staging location;

c. aligning the plurality of segmented modular elements at the project site;

d. attaching adjacent modular elements by applying an epoxy grout at each joint between each successive joint and applying compression about each joint to assure curing of the epoxy to the joint;

e. once all elements are assembled into a long span beam, inserting post-tensioning strands through the beam in a manner that post-tensioning forces are applied to the assembled beam; and f. erecting the assembled beam into a final position.

10. The method of claim 9, further comprising:

g. installing a UHPC stay-in-place form to create a topping form; and h. casting a bridge deck onto the topping form.

* * * * *